US012646990B2

(12) United States Patent
Sridharan et al.

(10) Patent No.: US 12,646,990 B2
(45) Date of Patent: Jun. 2, 2026

(54) ROTOR ASSEMBLY AND METHOD OF COOLING

(71) Applicant: GE AVIATION SYSTEMS LLC, Grand Rapids, MI (US)

(72) Inventors: Balamurugan Sridharan, Bengaluru (IN); Anirban Chatterjee, Bengaluru (IN)

(73) Assignee: GE Aviation Systems LLC, Grand Rapids, MI (US)

( * ) Notice: Subject to any disclaimer, the term of this patent is extended or adjusted under 35 U.S.C. 154(b) by 235 days.

(21) Appl. No.: 18/538,344

(22) Filed: Dec. 13, 2023

(65) Prior Publication Data

US 2025/0038599 A1     Jan. 30, 2025

(30) Foreign Application Priority Data

Jul. 28, 2023     (IN) ............................. 202311051005

(51) Int. Cl.
| | |
|---|---|
| *H02K 3/24* | (2006.01) |
| *H02K 1/26* | (2006.01) |
| *H02K 1/32* | (2006.01) |
| *H02K 3/48* | (2006.01) |

(52) U.S. Cl.
CPC ................. *H02K 3/24* (2013.01); *H02K 1/26* (2013.01); *H02K 1/32* (2013.01); *H02K 3/48* (2013.01)

(58) Field of Classification Search
CPC .. H02K 3/24; H02K 1/26; H02K 1/32; H02K 3/48; H02K 3/51; H02K 9/19; H02K 9/193; H02K 3/46; H02K 3/50; H02K 5/203; H02K 15/08
See application file for complete search history.

(56) References Cited

U.S. PATENT DOCUMENTS

| | | | |
|---|---|---|---|
| 886,035 | A | 4/1908 | Behrend |
| 922,946 | A | 5/1909 | Pomeroy |
| 2,894,155 | A | 7/1959 | Labastie |
| 3,048,725 | A | 8/1962 | Wesolowski |
| 5,059,843 | A | 10/1991 | Ishimoto et al. |
| 5,140,204 | A | 8/1992 | Cashmore et al. |
| 5,237,227 | A | 8/1993 | Huss |
| 5,666,016 | A | 9/1997 | Cooper |
| 6,903,470 | B2 | 6/2005 | Doherty et al. |
| 7,855,487 | B2 | 12/2010 | Lemmers, Jr. et al. |
| 7,902,702 | B2 | 3/2011 | Hashiba |
| 8,269,393 | B2 | 9/2012 | Patel et al. |
| 8,575,798 | B2 | 11/2013 | Takahashi et al. |
| 9,024,500 | B2 | 5/2015 | Kimura et al. |
| 9,614,407 | B2 | 4/2017 | Nishikawa |

(Continued)

FOREIGN PATENT DOCUMENTS

| | | |
|---|---|---|
| CN | 106787579 A | 5/2017 |
| EP | 0615333 B1 | 6/1997 |

(Continued)

*Primary Examiner* — Christopher M Koehler
*Assistant Examiner* — Viswanathan Subramanian
(74) *Attorney, Agent, or Firm* — Thomas | Horstemeyer, LLP

(57)     ABSTRACT

A rotor assembly includes a rotor core having a rotatable shaft and defining at least one rotor post, a winding wound around the post that defines an end turn, and a winding support assembly including a winding support assembly coupled to the rotatable shaft. The end turn defines a set of channels therethrough and is disposed in a first chamber defined by the winding support assembly.

16 Claims, 11 Drawing Sheets

(56)     References Cited

U.S. PATENT DOCUMENTS

| | | | |
|---|---|---|---|
| 9,837,868 | B2 | 12/2017 | Wirsch, Jr. et al. |
| 10,135,319 | B2 | 11/2018 | Hanumalagutti et al. |
| 10,333,365 | B2 | 6/2019 | Patel et al. |
| 10,554,088 | B2 | 2/2020 | Huang et al. |
| 10,931,171 | B2 | 2/2021 | Chatterjee et al. |
| 11,025,114 | B2 | 6/2021 | Sridharan et al. |
| 11,038,394 | B2 | 6/2021 | Chhabra et al. |
| 11,177,708 | B2 | 11/2021 | Huang et al. |
| 11,489,386 | B2 | 11/2022 | Huang et al. |
| 2016/0211712 | A1 | 7/2016 | Patel et al. |
| 2016/0211713 | A1 | 7/2016 | Patel et al. |
| 2020/0212742 | A1 | 7/2020 | Sridharan et al. |

FOREIGN PATENT DOCUMENTS

| | | | |
|---|---|---|---|
| EP | 3046230 | B1 | 9/2018 |
| EP | 2568574 | B1 | 4/2019 |
| FR | 2984034 | B1 | 8/2014 |
| FR | 3079978 | A1 | 10/2019 |
| WO | 2009029743 | A1 | 3/2009 |
| WO | 2009135742 | A2 | 11/2009 |
| WO | 2020020551 | A1 | 1/2020 |
| WO | 2020128888 | A1 | 6/2020 |
| WO | 2020191167 | A1 | 9/2020 |

169

169

154

300

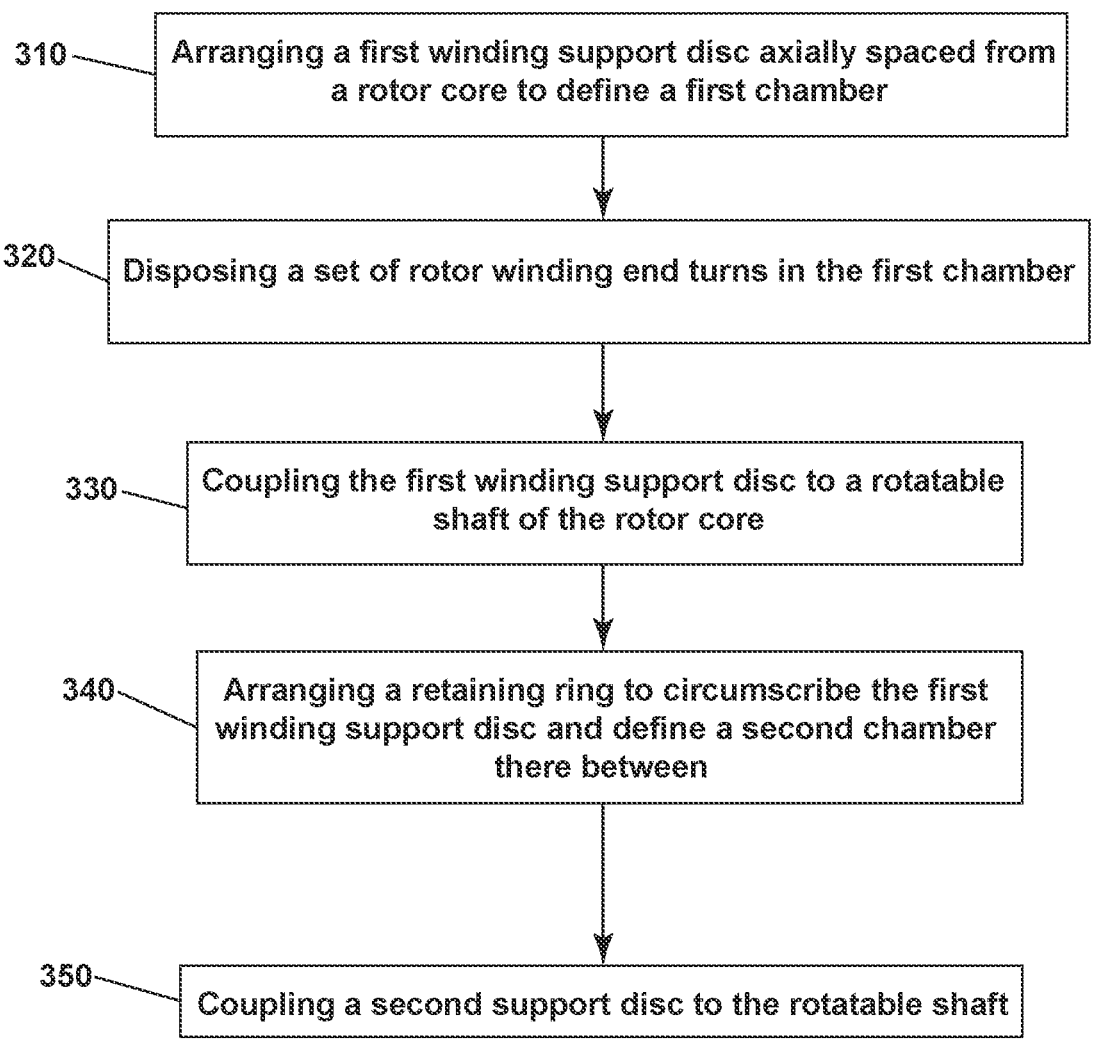

310 — Arranging a first winding support disc axially spaced from a rotor core to define a first chamber 320 — Disposing a set of rotor winding end turns in the first chamber 330 — Coupling the first winding support disc to a rotatable shaft of the rotor core 340 — Arranging a retaining ring to circumscribe the first winding support disc and define a second chamber there between 350 — Coupling a second support disc to the rotatable shaft

FIG. 11

ROTOR ASSEMBLY AND METHOD OF COOLING

CROSS REFERENCE TO RELATED APPLICATION

This application claims priority to Indian Provisional Application No. 202311051005, filed Jul. 28, 2023, the disclosure of which is hereby incorporated by reference in its entirety as though fully set forth herein.

BACKGROUND

Electric machines, such as electric motors or electric generators, are used in energy conversion. Such electrical machines operate through the interaction of magnetic fields, and current carrying conductors generate the force or electricity respectively. Typically, an electrical motor converts electrical energy into mechanical energy. Conversely, an electrical generator converts mechanical energy into electrical energy. For example, in the aircraft industry, it is common to combine a motor mode and a generator mode in the same electric machine, where the electric machine in motor mode functions to start the engine, and, depending on the mode, also functions as a generator.

BRIEF DESCRIPTION OF THE DRAWINGS

In the drawings:

FIG. 11 illustrates an exemplary method flowchart diagram of a method of assembling a winding support assembly in accordance with various aspects described herein.

DETAILED DESCRIPTION

Figure 1:
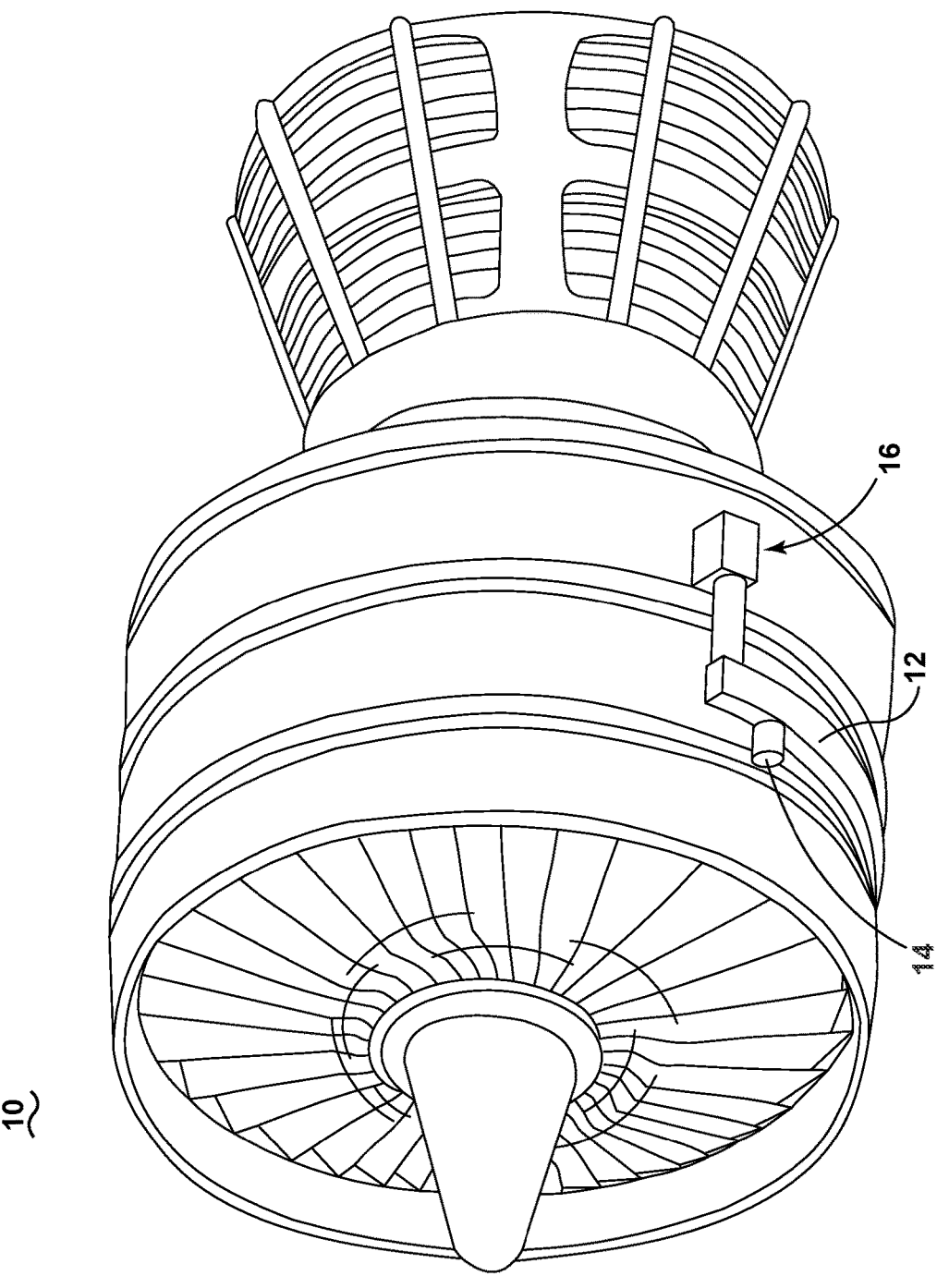
FIG. 1 is an isometric view of a gas turbine engine having a generator, in accordance with various aspects described herein.

Aspects of the disclosure can be implemented in any environment using an electric motor regardless of whether the electric motor provides a driving force or generates electricity. For purposes of this description, such an electric motor will be generally referred to as an electric machine, electric machine assembly, or similar language, which is meant to clarify that one or more stator/rotor combinations can be included in the machine. While this description is primarily directed toward an electric machine providing power generation, it is also applicable to an electric machine providing a driving force or an electric machine providing both a driving force and power generation. Further, while this description is primarily directed toward an aircraft environment, aspects of the disclosure are applicable in any environment using an electric machine. Thus, a brief summary of a contemplated environment should aid in a more complete understanding.

While "a set of" various elements will be described, it will be understood that "a set" can include any number of the respective elements, including only one element. As used herein, the terms "axial" or "axially" refer to a dimension along a longitudinal axis of a generator or along a longitudinal axis of a component disposed within the generator.

As used herein, the terms "radial" or "radially" refer to a dimension extending between a center longitudinal axis, an outer circumference, or a circular or annular component disposed thereof. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

As used herein, a "wet" cavity generator includes a cavity housing the rotor and stator that is exposed to free liquid coolant (e.g. coolant freely moving within the cavity). In contrast, a "dry" cavity generator the rotor and stator can be cooled by coolant contained within limited in fluidly sealed passages (e.g. non-freely moving about the cavity).

As used herein, the term "underlie" denotes a relative position radially closer to a rotational axis of a rotatable shaft. Also as used herein, the term "overlie" denotes a relative position radially farther from the rotational axis of the rotatable shaft.

As used herein, the term "electrically insulative" refers to a material that exhibits a low electrical conductivity (for example, less than about 10-8 siemens per meter (S/m)).

Aspects of the disclosure described herein are directed to an electrical machine, and more specifically to a rotor assembly for an electrical machine. The rotor assembly, as described herein, can include a rotatable element defining a central rotational axis and defining a periphery. A set of rotor windings can be wound about the periphery to form a coil. For the purposes of illustration, exemplary aspects will be described herein in the form of an electrical machine, specifically a generator, for a gas turbine engine and having a rotor assembly. It will be appreciated however, that the electrical machine can be in the form of a generator, a motor, a permanent magnet generator (PMG), or a starter/generator (S/G), and the like, in non-limiting examples. It will be further understood, however, that aspects of the disclosure described herein are not so limited and can have general applicability within other electrical machines or systems. For example, the disclosure can have applicability for systems in other engines or vehicles, and may be used to provide benefits in industrial, commercial, and residential applications.

For example, conventional wound-rotor generators, are a major source of electrical energy for industrial and commercial applications. They are commonly used to convert the mechanical power output of steam turbines, gas turbines, reciprocating engines and hydro turbines into electrical power. Typically, these electrical machines include a central rotatable assembly or "rotor" that is circumscribed by a stationary assembly or "stator". A small air gap separates the rotor and stator. The rotor includes a rotatable shaft and a "rotor core" having one or more sets of conductive rotor windings or coils. The rotor windings can be axially wound around a set of posts or rotor teeth defining slots therebetween. The number of sets of rotor windings typically define the number of electrical phases of the electrical machine. A portion of the windings (e.g., an end turn portion) of conventional rotors typically extend past or overhang the rotor. The rotor winding end turns in some electric machines are supported and/or covered by a housing, cover, or other structure. In some cases, the rotor core can be oil cooled.

In operation, the rotor core of conventional electric machines, such as motors, generators, and the like, is driven to rotate by a source of rotation, such as a mechanical or electrical machine, which for some aircraft may be a gas turbine engine. The rotors are often rotated at relatively high revolutions per minute (rpm) (e.g., 20,000-500,000 rpm).

Due to the relatively linear relation between rotational speed and shaft power of an electrical machine, increasing the rated speed of a generator can boost the power density and efficiency of the generator. Accordingly, there is a growing demand for conventional electric machines, such as generators, to operate at increasingly higher speeds. However, due to the high rotational speeds, relatively large centrifugal and axial forces can be imposed upon the generator, and particularly the rotor windings. The repeated application of strong centrifugal forces and vibrations under normal operation can weaken or break the rotor windings over time.

Consequently, rotors typically require rugged construction to tolerate such forces over long periods of time, and despite this rugged construction, such rotors typically need to remain balanced to minimize vibration of the rotor windings, to reduce the risk of failures associated with improper balancing and deflection or relative movement of the rotor windings at high rotational speeds.

Additionally, the rotor end windings support structure are typically not continuous in the winding end turn region, with open areas or gaps within or between supporting elements. At higher rotational speeds, such discontinuous architectures in the winding end turn support structures can result in windage losses. Windage losses limit or reduce the operating efficiency of the generator, resulting in a need for additional oil cooling or a reduction in operating speed.

Thus, there is a need for a high-speed electrical machine having improved rotor winding end turn retention and support, while reducing windage losses. For example, there is a need for a rotor core having an improved rotor winding end turn support structure in order to improve the dynamic balance of the rotor core, reduce deflection or relative movement of the rotor winding end turns, and reduce windage losses, while enabling easier, lower cost assembly.

Furthermore, heat is generated in the rotor due to the flow of current through the windings, and changing magnetic fields present in the rotor, causing the temperature to rise in the rotor. It is desirable to cool the rotor to protect the electrical machine from damage and to increase the electrical machine power density to allow for more power from a smaller physically sized electric motor.

The exemplary drawings are for purposes of illustration only and the dimensions, positions, order and relative sizes reflected in the drawings attached hereto can vary.

FIG. 1 illustrates a gas turbine engine 10 having an accessory gear box (AGB) 12 and an electric machine or generator 14 according to an aspect of the disclosure. The gas turbine engine 10 can be a turbofan engine, such as a General Electric GEnx or CF6 series engine, commonly used in modern commercial and military aviation or it could be a variety of other known gas turbine engines such as a turboprop or turboshaft. The AGB 12 can be coupled to a turbine shaft (not shown) of the gas turbine engine 10 by way of a mechanical power take off 16. The gas turbine engine 10 can be any suitable gas turbine engine used in modern aviation or it could be a variety of other known gas turbine engines such as a turboprop or turboshaft. The type and specifics of the gas turbine engine 10 are not germane to the disclosure and will not be described further herein. While a generator 14 is shown and described, aspects of the disclosure are not so limited, and aspects can include any electromotive or electrical machine, such as, without limitation, a motor, or generator.

Figure 2:
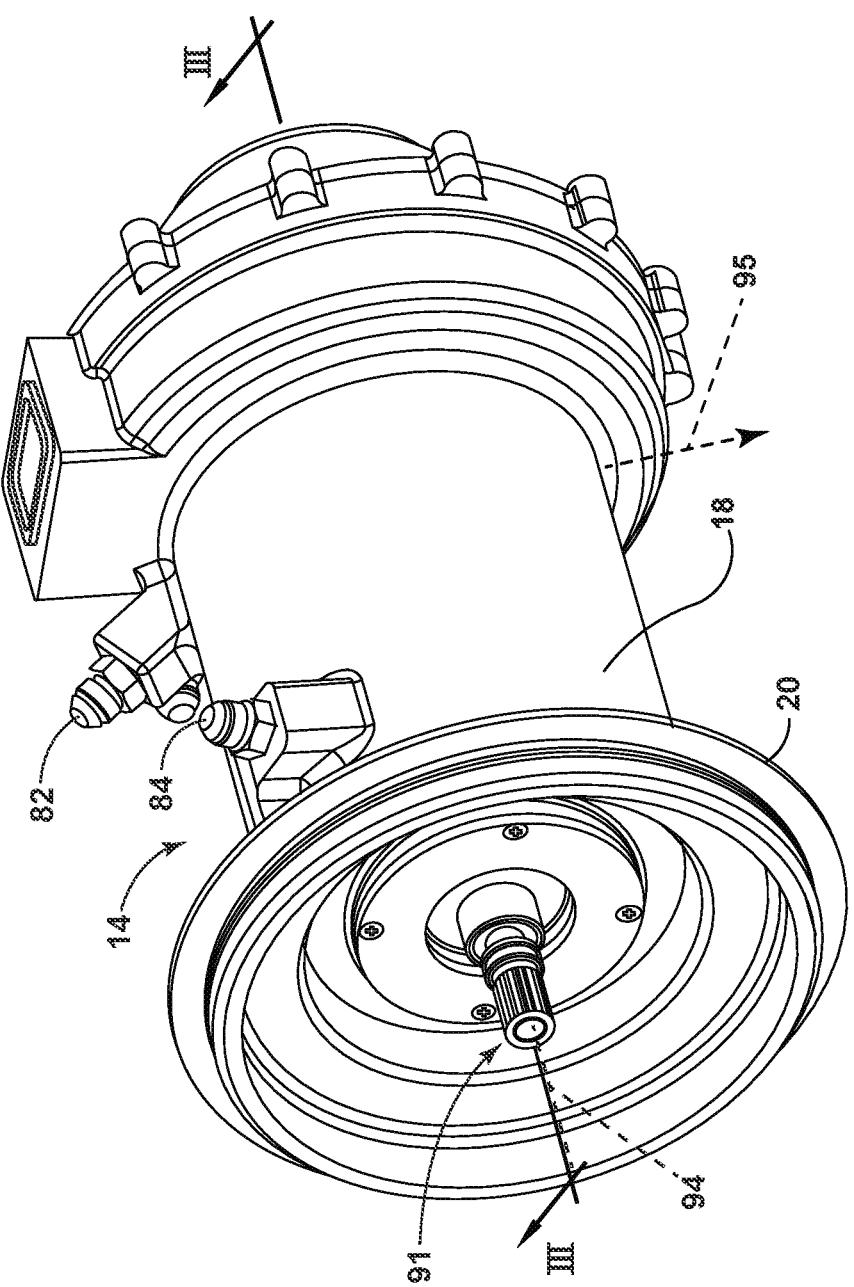
FIG. 2 is an isometric view of an exterior of the generator of FIG. 1, in accordance with various aspects described herein.

FIG. 2 more clearly illustrates a non-limiting example of generator 14 and its housing 18 in accordance with aspects of the disclosure. The generator 14 can include a clamping interface 20, used to clamp the generator 14 to the AGB (not shown). Multiple electrical connections can be provided on the exterior of the generator 14 to provide for the transfer of electrical power to and from the generator 14. The electrical connections can be further connected by cables to an electrical power distribution node of an aircraft having the gas turbine engine 10 to power various items on the aircraft, such as lights and seat-back monitors. The generator 14 can include a liquid coolant system for cooling or dissipating heat generated by components of the generator 14 or by components proximate to the generator 14, one non-limiting example of which can be the gas turbine engine 10. For example, the generator 14 can include a liquid cooling system using oil as a coolant.

The liquid cooling system can include a cooling fluid inlet port 82 and a cooling fluid outlet port 84 for controlling the supply of coolant to the generator 14. In one non-limiting example, the cooling fluid inlet and outlet ports 82, 84 can be utilized for cooling at least a portion of a rotor or stator of the generator 14. The liquid cooling system can also include a second coolant outlet port 91, shown at a rotatable shaft portion of the generator 14. Optionally, by way of non-limiting example, the liquid cooling system can include a rotatable shaft coolant inlet port 94 or a generator coolant outlet port 95. While not shown, aspects of the disclosure can further include other liquid cooling system components, such as a liquid coolant reservoir fluidly coupled with the cooling fluid inlet port 82, the rotatable shaft coolant inlet port 94, the cooling fluid outlet port 84, or the generator coolant outlet port 95, and a liquid coolant pump (not shown) to forcibly supply the coolant through the ports 82, 84, 94, 95 or generator 14.

Figure 3:
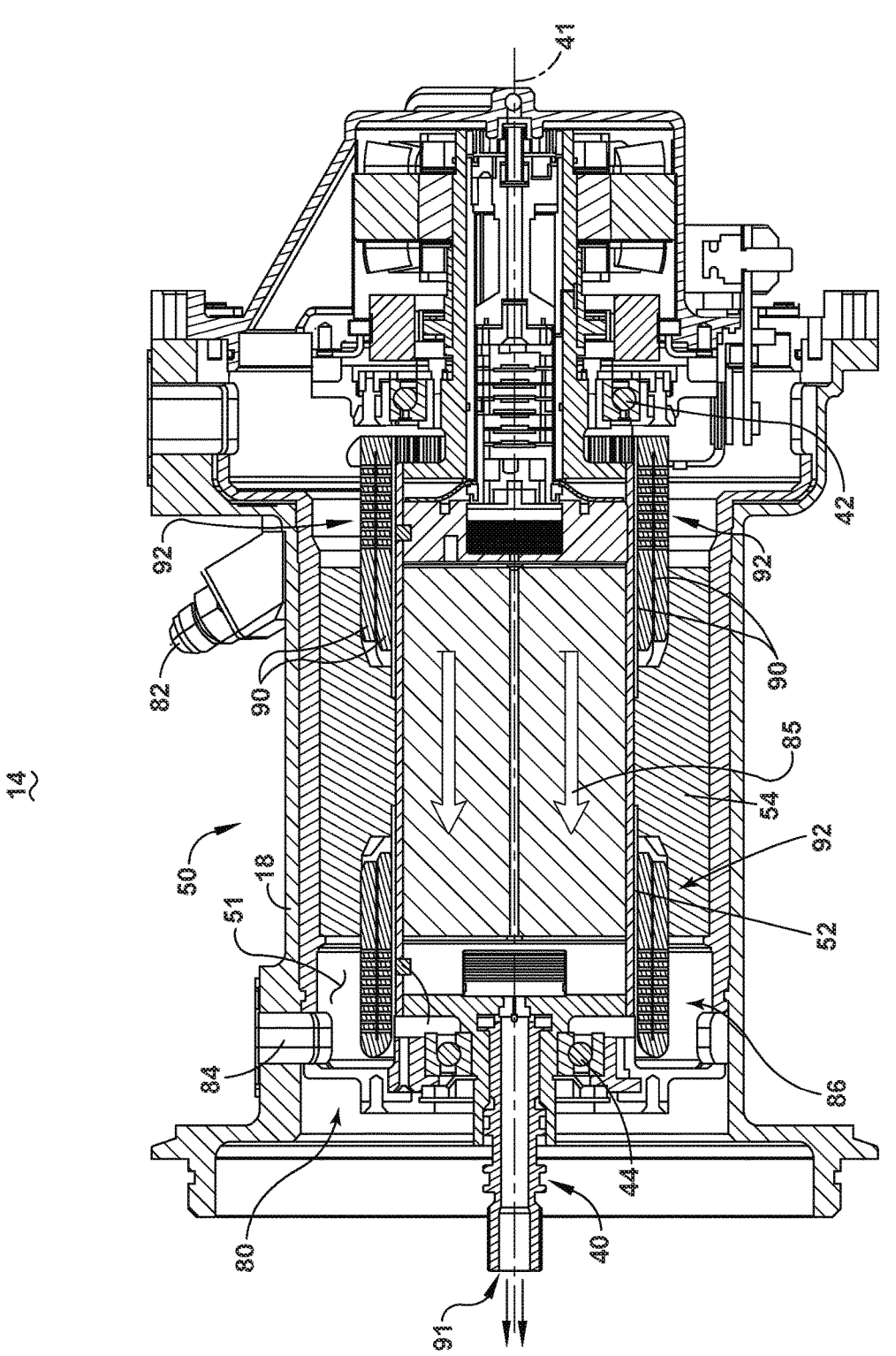
FIG. 3 is a schematic cross-sectional view of the generator of FIG. 2, taken along line III-III of FIG. 2, in accordance with various aspects described herein.

A non-limiting interior of the generator 14 is best seen in FIG. 3, which is a cross-sectional view of the generator 14 shown in FIG. 2 taken along line III-III. A rotatable shaft 40 is located within the generator 14 and is the primary structure for supporting a variety of components. The rotatable shaft 40 can have a single diameter or one that can vary along its length. The rotatable shaft 40 is supported by spaced bearings 42 and 44 and configured to rotate about a rotational axis 41. Several of the elements of the generator 14 have a fixed component and a rotating component, with the fixed component fixed relative to the housing 18 and with the rotating component being provided on, or rotatably fixed relative to the rotatable shaft 40. Examples of these elements can include an electrical machine 50, housed within a cavity 51. The rotating component comprises a rotor 52, and the corresponding fixed component comprises a stator 54 or stator core. In this manner, the rotor 52 is disposed on and co-rotates with the rotatable shaft 40. The fixed components can be mounted to any suitable part of the housing 18. Collectively, the fixed components define an interior through which the rotatable shaft 40 extends and rotates relative thereto.

It will be understood that the rotor 52 can have a set of rotor poles, and that the stator 54, can have a set of stator poles. The set of rotor poles can generate a set of magnetic fields relative to the set of stator poles, such that the rotation of the rotor magnetic fields relative to the stator poles generate current in the respective stator components.

At least one of the rotor poles and stator poles can be formed by a core with a post and wire wound about the post to form a winding, with the winding having at least one end turn. Aspects of the disclosure shown include at least one set of stator windings 90 arranged longitudinally along the housing 18, that is, in parallel with housing 18 and the rotational axis 41. The set of stator windings 90 can also include a set of stator winding end turns 92 extending axially beyond opposing ends of a longitudinal length of a stator 54.

The components of the generator 14 can be any combination of known generators. For example, the 50 can be either a synchronous or asynchronous generator. In addition to the accessories shown in this aspect, there can be other components that need to be operated for particular applications. For example, in addition to the electromechanical accessories shown, there can be other accessories driven from the same rotatable shaft 40 such as the liquid coolant pump, a fluid compressor, or a hydraulic pump.

As explained above, the generator 14 can use a cooling fluid, such as oil, and thus can include a cooling system 80. The cooling oil or fluid can be used to dissipate heat generated by the electrical and mechanical functions of the generator 14. The cooling system 80 using a cooling fluid can also provide for lubrication of the generator 14. In the illustrated aspects, the generator 14 can be an oil-cooled, wet cavity type cooling system 80 including the cooling fluid inlet port 82 and the cooling fluid outlet port 84 for controlling the supply of the cooling fluid to the cooling system 80. The cooling system 80 can further include, for example, a cooling fluid reservoir 86 and various cooling passages. The rotatable shaft 40 can provide one or more channels or paths for coolant or fluid coolant flow 85 (shown schematically as arrows) for the rotor 52, as well as the second coolant outlet port 91, wherein residual, unused, or unspent oil can be discharged from the rotatable shaft 40.

In non-limiting examples of the generator 14, the fluid coolant flow 85 can further be directed, exposed, sprayed, or otherwise deposited onto the set of stator windings 90, the set of stator winding end turns 92, or onto alternative or additional components. In this example, the fluid coolant flow 85 can flow from the rotatable shaft 40 radially outward toward the set of stator windings 90 or the set of stator winding end turns 92. In this sense, the coolant can cool the respective set of stator windings 90 or set of stator winding end turns 92.

Figure 4:
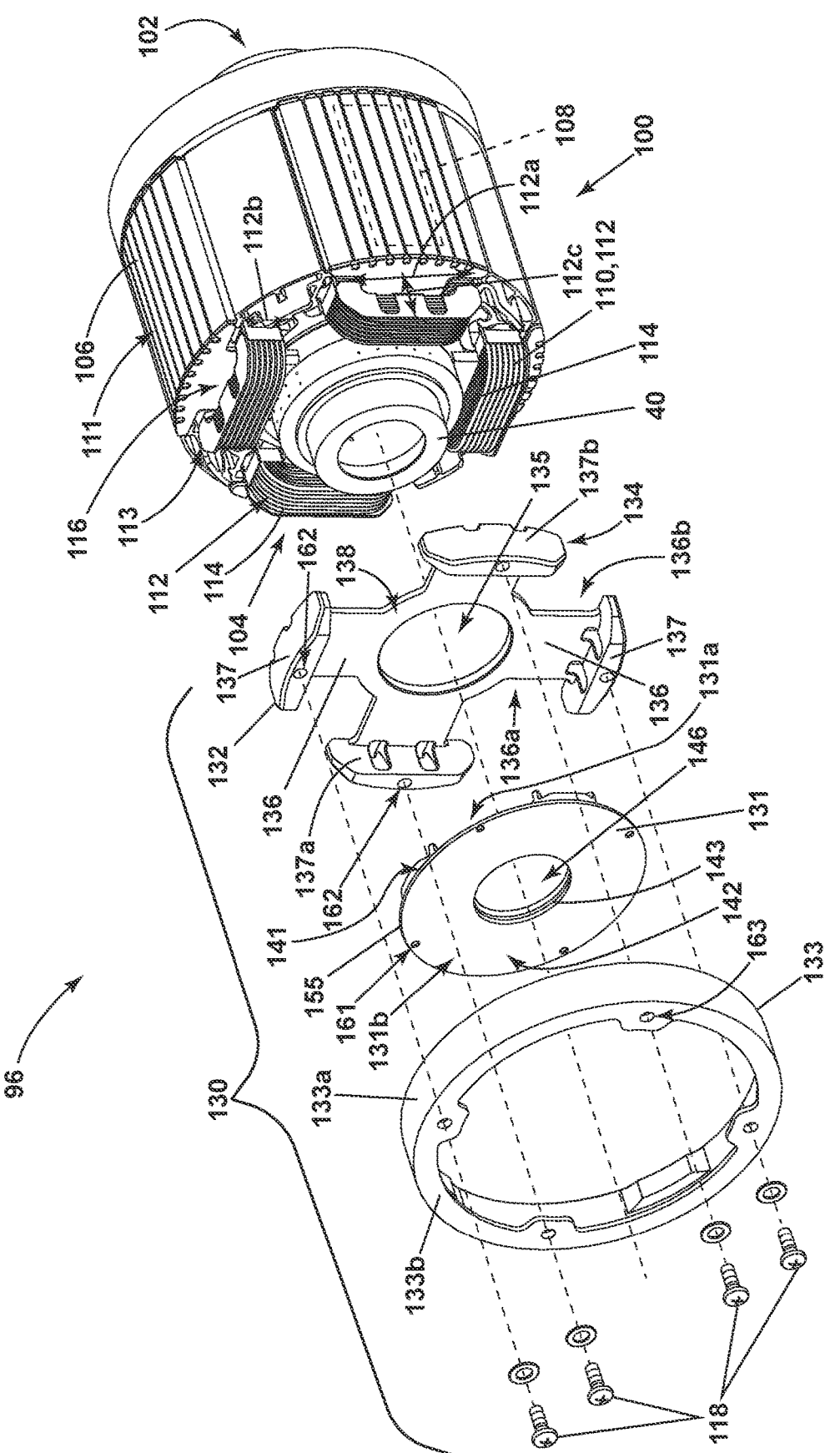
FIG. 4 illustrates a partially exploded isometric view of a rotor assembly and winding support for the generator of FIG. 3, in accordance with various aspects described herein.

FIG. 4 illustrates a partially exploded perspective view of a rotor assembly 96 such as for a main electrodynamic machine. As shown, the rotor assembly 96 can include a rotor core 100, such as a laminated rotor core, rotatably connected to co-rotate with the rotatable shaft 40. The rotor assembly 96 can include a set of winding support assemblies 130. Each winding support assembly 130 can respectively include a first winding support disc 131, a second winding support disc 132, and a retaining ring 133.

The rotor assembly 96 can further define a first end 102 and a second end 104, axially spaced from the first end 102. The rotor assembly 96 can include at least one rotor pole 106 defined by a rotor post 108 and formed when at least a portion of the rotor core 100 is wound with one or more sets of conductive rotor wiring or rotor windings 110 about a respective rotor post 108. The rotor windings 110 wound around the rotor post 108 can define a respective axial winding portion 111 extending axially along the rotor core 100, and respective rotor winding end turns 112 extending axially beyond the rotor core 100. In the perspective of the illustrated example, each rotor post 108 can radially underlie a respective set of rotor windings 110. While the rotor windings 110 or the rotor winding end turns 112 can refer to a set of or plural windings or end turns, an end turn can include only one of the set of rotor windings 110, or only one portion of the set of rotor windings 110 extending axially beyond the rotor core 100, such as only at the first end 102 or the second end 104.

Each set of rotor winding end turns 112 can define a respective loop or arcuate bight portion 113 overhanging or extending axially beyond the rotor core 100. Each set of rotor winding end turns 112 can define a circumferential width 112a, a radial height 112b, and an axial length 112c. In non-limiting aspects, each bight portion 113 can further define a respective channel 116 extending radially therethrough. For example, in non-limiting aspects each respective channel 116 can have a respective circumferential width defined by a circumferential width of corresponding rotor post 108. Additionally, a set of radially extending end turn passages 114 can be defined by gaps between immediately adjacent rotor winding end turns 112.

A respective winding support assembly 130 can be rotatably coupled to each end of the rotatable shaft 40 of the rotor assembly 96 such that a rotation of the rotatable shaft 40 causes a rotation of the winding support assemblies 130. In non-limiting aspects, a respective winding support assembly 130 can be coupled to one end (e.g., either the first end 102 or the second end 104) of the rotor assembly 96. In other aspects, a respective winding support assembly 130 can be rotatably coupled to the rotatable shaft 40 at both the first end 102 and the second end 104 of the rotor assembly 96.

The first winding support disc 131 can be an annular member having an axially inward facing (e.g., toward the rotor core 100) first side 131*a* defining a first surface 141, and an axially outward facing, (e.g., away from the rotor core 100) second side 131*b* defining a second surface 142. In non-limiting aspects, the first winding support disc 131 can comprise an annular first wall 151 defining a radially inward facing third surface 143. In non-limiting aspects, the first winding support disc 131 can define a set of first fastener apertures 161 sized to receive a fastener therethrough.

The third surface 143 can define a bore 146 extending from the first surface 141 to the second surface 142, and sized to receive the rotatable shaft 40 therethrough. In non-limiting aspects, the third surface 143 can be in fluid communication with the rotatable shaft 40 and configured to receive the fluid coolant flow 85 therefrom. As such, in non-limiting aspects, the third surface 143 can define a coolant collection surface. The first winding support disc 131 can be fixed to the rotatable shaft 40 via the third surface 143 using one or more bolts, screws, pins, keys, splines, or other known fasteners (not shown). In other non-limiting aspects, the first winding support disc 131 can be coupled to the rotatable shaft 40 via an interference, friction, or press-fit engagement between the first winding support disc 131 and the rotatable shaft 40. Other aspects are not so limited, and it is contemplated that the first winding support disc 131 can be rotatably coupled to the rotatable shaft 40 by any desired affixing mechanisms. It will be appreciated that when so coupled, a rotation of the rotatable shaft 40 will result in a corresponding rotation of the first winding support disc 131.

The second winding support disc 132 can comprise a radially inboard or radially central portion 138 and a radially outer portion 134 (e.g., a peripheral portion) disposed radially outward from the radially central portion 138. In aspects, the radially central portion 138 can define a bore 135 therethrough. In non-limiting aspects, the radially central portion 138 can be coupled to the radially outer portion 134 via a set of radially extending spokes 136. For example, in some aspects, each spoke 136 can comprise a first end 136*a* coupled to the radially central portion 138, and an opposing second end 136*b* coupled to the radially outer portion 134. The spokes 136 can be circumferentially spaced from each other about the second winding support disc 132.

In non-limiting aspects, the number of spokes 136 can correspond to the number of rotor poles 106 of the rotor assembly 96. In aspects, each spoke 136 can be operatively disposed between the rotor core 100 and a respective set of rotor winding end turns 112. For example, in non-limiting aspects, each spoke 136 can be disposed within a respective channel 116 and extend radially therethrough. In this sense, each set of rotor winding end turns 112 can be wound or wrapped at least partially about a respective spoke 136. In non-limiting aspects, each respective spoke 136 can have a width defined by a width of a corresponding rotor post 108. Other aspects are not so limited, and each respective spoke 136 can have a width that is narrower than a corresponding rotor post 108, or wider than a corresponding rotor post 108, without departing from the scope of the disclosure.

In some aspects, each spoke 136 can be at least partially surrounded by a respective set of rotor winding end turns 112 and can provide support to, or limit a axial deflection or relative axial movement of, the respective set of rotor winding end turns 112. The radially central portion 138 of the second winding support disc 132 can at least partially underlie the rotor winding end turns 112. In this example, "underlie" denotes a relative position radially closer to the rotational axis 41.

In non-limiting aspects, the second winding support disc 132 can receive the rotatable shaft 40 through the bore 135. The second winding support disc 132 can be fixed to the rotatable shaft 40 using one or more bolts, screws, pins, keys, or other known fasteners. In other non-limiting aspects, the second winding support disc 132 can be coupled to the rotatable shaft 40 via an interference, friction, or press-fit engagement between the second winding support disc 132 and the rotatable shaft 40. Other aspects are not so limited, and it is contemplated that the second winding support disc 132 can be rotatably coupled to the rotatable shaft 40 by any desired affixing mechanisms. It will be appreciated that when so coupled, a rotation of the rotatable shaft 40 will result in a corresponding rotation of the second winding support disc 132.

While FIG. 4 depicts a non-limiting example of the second winding support disc 132 configured for a 4-pole rotor assembly 96, other aspects are not so limited. It will be appreciated that aspects as disclosed herein are not limited to any specific number of rotor poles, and aspects of the second winding support disc 132 can be adapted to rotor assemblies 96 having any desired number of poles.

In non-limiting aspects, the radially outer portion 134 of the second winding support disc 132 can comprise a set of elements or segments 137. In non-limiting aspects, the segments 137 can be circumferentially spaced from each other. Each segment 137 can be coupled to a respective second end 136*b* of a corresponding spoke 136. In non-limiting aspects, the number of segments 137 can correspond to the number of rotor poles 106 of the rotor assembly 96. In non-limiting aspects, one or more of the segments 137 can define a set of second fastener apertures 162 sized to receive a fastener therethrough. In aspects, the second fastener apertures can be arranged in registry with the first fastener apertures 161.

As shown, in some aspects, the segments 137 can define an arcuate shape. Other aspects are not so limited, and the segments 137 can define any desired shape without departing from the scope of the disclosure. Each segment 137 can comprise a respective outwardly facing, radially outer surface 137*b*, and an opposing inwardly facing, radially inner surface 137*a*. In non-limiting aspects, the radially inner surface 137*a* can underlie at least a portion of the radially outer surface 137*b*.

The radially outer portion 134 (e.g., the segments 137) can at least partially overlie the rotor winding end turns 112. In this example, "overlie" denotes a relative position radially farther from the rotational axis 41. For example, in non-limiting aspects, each segment 137 can overlie a respective set of rotor winding end turns 112. In this way, each segment can limit a radial deflection or relative radial movement of the respective set of rotor winding end turns 112.

In non-limiting aspects, the retaining ring 133 can be disposed to circumscribe the first winding support disc 131 or the second winding support disc 132 or both. For example, the retaining ring 133 can include an annular first leg 133*a* and an annular second leg 133*b*. The first leg 133*a* can overlie or radially surround the first winding support disc 131. The second leg 133*b* can be arranged transverse to the first leg 133*a*. For example, the second leg 133*b* can extend radially inward away from the first leg 133*a*, and arranged to face the second side 131*b* of the first winding support disc 131. In non-limiting aspects, the retaining ring 133 can define a set of third fastener apertures 163 sized to receive a fastener therethrough. The retaining ring 133 can be rigidly or fixedly coupled to the first winding support disc 131, or the second winding support disc 132, or both. For example, the retaining ring 133 can be coupled to the first winding support disc 131 using bolts or other fasteners 118 disposed through respective third fastener apertures 163 and respective first fastener apertures 161, or second fastener apertures 162, or combinations thereof. In other aspects, the retaining ring 133 can additionally, or alternatively be coupled to the second winding support disc 132 via the fasteners 118. It will be appreciated that when so coupled, a rotation of the rotatable shaft 40 will result in a corresponding rotation of the second winding support disc 132 and the retaining ring 133. When so arranged, the retaining ring 133, and second winding support disc 132 can limit or arrest a radial deflection or relative radial movement of the first winding support disc 131. Additionally, in some aspects, the retaining ring 133 and first winding support disc 131 can cooperatively limit an axial deflection or relative axial movement of the rotor winding end turns 112.

Figure 5C:
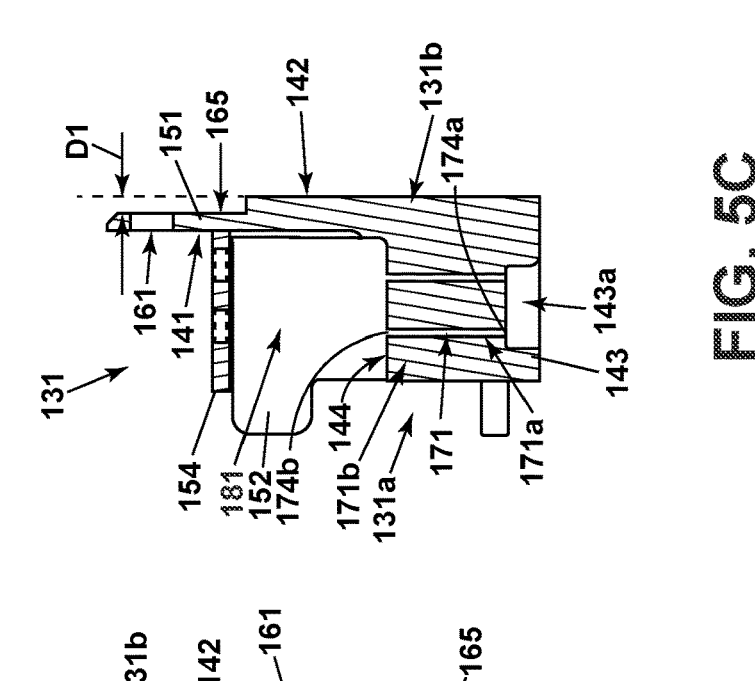
FIG. 5C is a cross-section of the first winding support disc of FIG. 5B, taken along line VII-VII of FIG. 5B, in accordance with various aspects described herein.
Figure 5B:
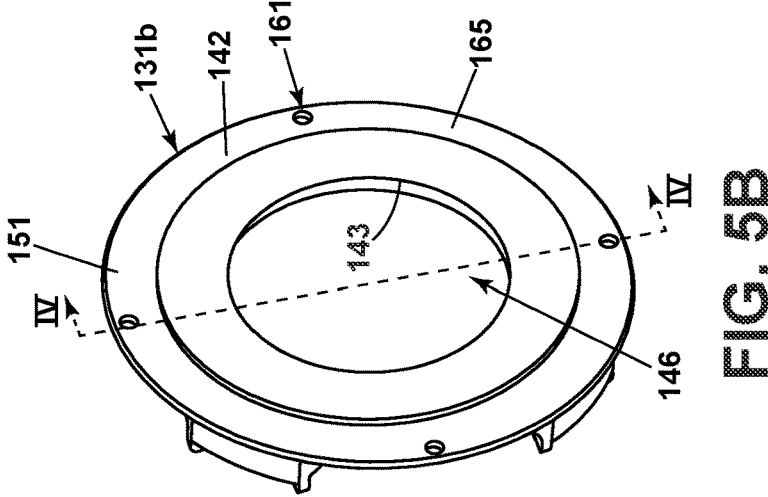
FIG. 5B is a perspective view of a second side of the first winding support disc of FIG. 5A, in accordance with various aspects described herein.
Figure 5A:
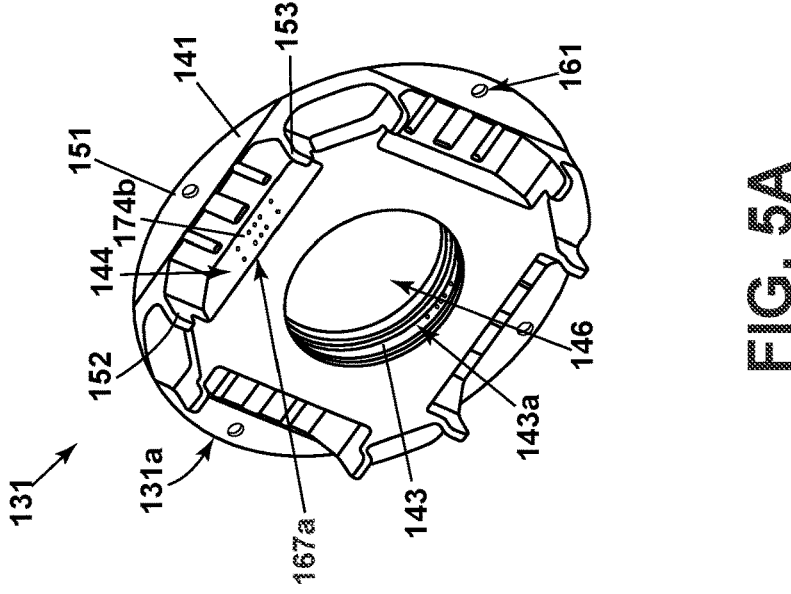
FIG. 5A is a perspective view of a first side of the first winding support disc of the rotor assembly of FIG. 4, in accordance with various aspects described herein.

Non-limiting aspects of the first winding support disc 131 will be described in more detail with simultaneous reference to FIGS. 5A, 5B, and 5C. FIG. 5A depicts a perspective view of an exemplary non-limiting aspect of the first side 131a of the first winding support disc 131. FIG. 5B depicts a perspective view of the opposing second side 131b of another non-limiting aspect of the first winding support disc 131, while FIG. 5C depicts a cross-section view of the first winding support disc 131 of FIG. 5B viewed from the line IV-IV. While FIG. 5A depicts a non-limiting example of the first winding support disc 131 configured for a 4-pole rotor assembly 96, other aspects are not so limited. It will be appreciated that aspects as disclosed herein are not limited to any specific number of rotor poles, and aspects can be adapted to rotor assemblies 96 having any desired number of poles.

As shown in FIG. 5A, in non-limiting aspects, the first side 131a of the first winding support disc 131 can include a second wall 152, and a third wall 153. In some non-limiting aspects, as shown in FIG. 5C, the first winding support disc 131 can further include a fourth wall 154. Additionally, the first wall 151 can further define a radially outward facing fourth surface 144 opposingly spaced from the third surface 143. It will be appreciated that while aspects are described herein for ease of description and brevity as having a single first wall 151, second wall 152, third wall 153, and fourth wall 154, other aspects are not so limited and can include any number of the first wall 151, second wall 152, third wall 153, and fourth wall 154, as desired without departing from the scope of the disclosure. For example, in non-limiting aspects, the rotor core 100 can comprise the set of rotor winding end turns 112 (as shown in FIG. 4), and the first winding support disc 131 can comprise a number of the first walls 151, second walls 152, third walls 153, and fourth walls 154 (as shown in FIG. 5A), each corresponding to a respective rotor winding end turn 112.

In some aspects, the third surface 143 can be a relatively smooth surface. In other non-limiting aspects, the third surface 143 can define one or more channels or grooves 143a thereon. The one or more grooves 143a can circumscribe the rotatable shaft 40 (FIG. 4). The one or more grooves 143a can be arranged in fluid communication with the rotatable shaft 40. As such, the one or more grooves 143a can operatively define a coolant reservoir.

The second wall 152 and the third wall 153 can extend radially outward from the fourth surface 144, and axially inward from the first surface 141. The second wall 152 and the third wall 153 are circumferentially spaced from each other to define a circumferential gap 167a therebetween. In non-limiting aspects, the circumferential gap 167a can defined by distance equal to, or greater than, a circumferential width 112a of the corresponding set of rotor winding end turns 112. As such, during assembly, the corresponding set of rotor winding end turns 112 (FIG. 4) can be snugly received in the circumferential gap 167a and retained between the second wall 152 and the third wall 153. Furthermore, in non-limiting aspects, the second wall 152 and the third wall 153 can have a respective axial length equal to the axial length 112c of a corresponding set of rotor winding end turns 112 (FIG. 4).

The fourth wall 154 can extend between the second surface 142 and third surface 143 and extend axially inward (e.g., toward the rotor core 100 shown in FIG. 4) from the first surface 141. The fourth wall 154 is opposingly spaced radially outwardly from the fourth surface 144. In non-limiting aspects the fourth wall 154 can be fixedly coupled to the first surface 141 of the first wall 151. In non-limiting aspects, the fourth wall 154 can be radially spaced from the fourth surface 144 by a distance equal to or greater than the radial height 112b of a set of corresponding rotor winding end turns 112. As such, during assembly, the corresponding set of rotor winding end turns 112 (FIG. 4) can be snugly received in and retained between the second wall 152 and the third wall 153.

As shown in FIG. 5C, in non-limiting aspects, the second wall 152, third wall 153, fourth wall 154, fourth surface 144 of the first wall 151, and first surface 141 of the first winding support disc 131 (as shown in FIG. 4) are arranged to cooperatively define a first chamber 181 therebetween. The first chamber 181 is sized to receive the rotor winding end turns 112 (shown in FIG. 4) therein.

The first wall 151 can further include a set of first channels 171 defined therethrough. The first channels 171 can be sized to allow a flow of coolant fluid therethrough. In non-limiting aspects, the first channels 171 can be circumferentially spaced from each other about the first wall 151. Each first channel 171 can extend radially from a first end 171a at the third surface 143 to an opposing second end 171b at the fourth surface 144. As such, each second end 171b is disposed radially outward from the corresponding first end 171a. Each first channel 171 can comprise a coolant inlet 174a defined on the third surface 143, and a corresponding coolant outlet 174b defined on the fourth surface 144, at the opposing second end 171b.

In aspects, the first channels 171 can be in fluid communication with the third surface 143, or the one or more grooves 143a, or both, to receive the fluid coolant flow therefrom. Each coolant outlet 174b can be a respective spray nozzle and can be disposed at circumferentially spaced intervals on the fourth surface 144.

The second surface 142 of the first wall 151 can define a recess 165 or seat portion defined thereon. The recess 165 can be annular and arranged along a radially outer circumferential periphery of the second side 131b of the first wall 151. The recess 165 can be recessed from an adjacent or abutting portion of the second surface 142 by a depth D1. The depth D1 can be based on a thickness of the second leg 133b (shown in FIG. 4) to provide a seating surface for the second leg 133b. In this way, when assembled, the recess 165 or seat portion can receive the second leg 133b of the retaining ring such that the second surface 142 and second leg 133b cooperatively define a continuous axially outward facing surface.

In non-limiting aspects, the fourth wall 154 can be formed as unitary part of the first winding support disc 131. For example, in some aspects, the first winding support disc 131 and fourth wall 154 can be molded or otherwise formed as a single structure. In other non-limiting aspects, the fourth wall 154 can comprise a separate element distinct from the first winding support disc 131.

Figure 6:
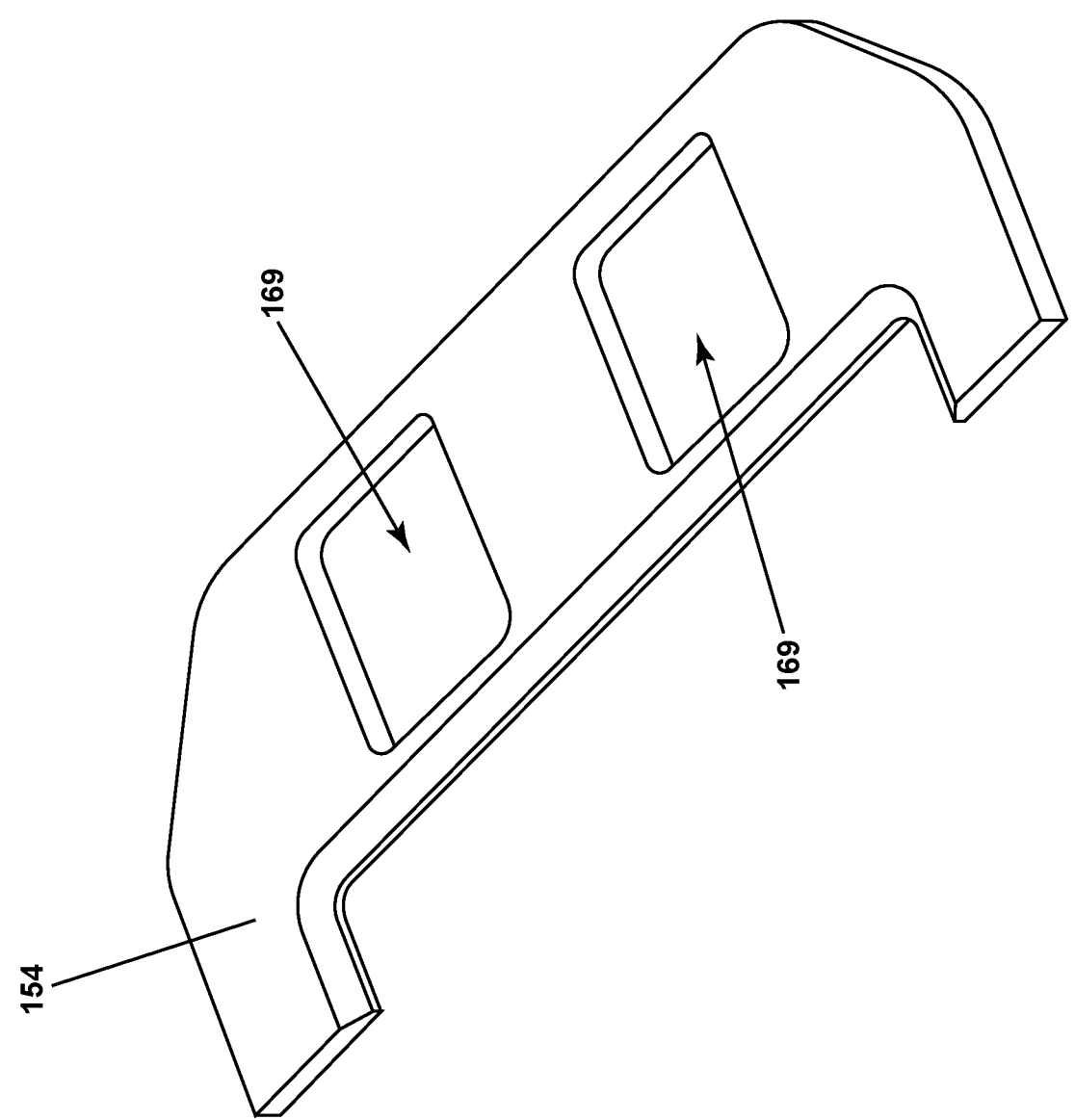
FIG. 6 is a perspective view of the fourth wall of the first winding support disc of FIG. 5C, in accordance with various aspects described herein.

For example, with reference to FIG. 6, a non-limiting example of an aspect of the fourth wall 154 is illustrated. As shown, the fourth wall can define a set of apertures or passages 169 extending radially therethrough.

Figure 7:
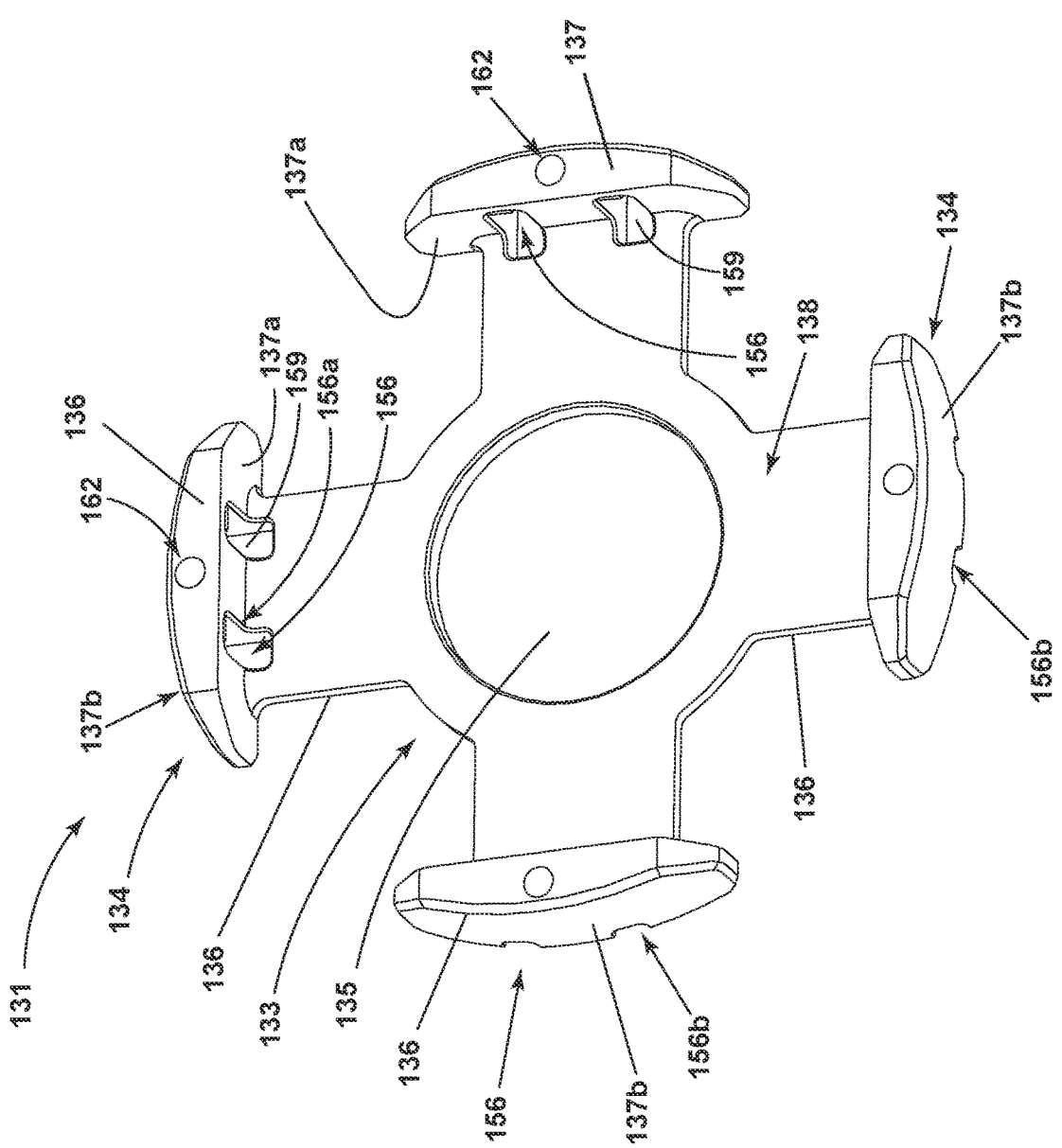
FIG. 7 illustrates an isometric view of the second winding support disc of the rotor assembly of FIG. 4, in accordance with various aspects described herein.

FIG. 7 is an isometric view of a non-limiting aspect of the second winding support disc 132. The radially outer portion 134 of the second winding support disc 132 can include a set of second channels 156 defined therethrough. The second channels 156 can be sized to allow flow of cooling fluid (e.g., oil) therethrough. In some aspects, each segment 137 can include a respective one or more second channels 156. In other aspects, only a subset of the segments 137 can include one or more second channels 156. Each second channel 156 can comprise a coolant inlet 156a defined by a corresponding radially inner surface 137a, and a coolant outlet 156b defined by a corresponding radially outer surface 137b, at an opposing second end of the second channel 156. In non-limiting aspects, each second channel 156 can be defined by a respective fluid collection surface 159 disposed between the coolant inlet 156a and the coolant outlet 156b. The fluid collection surface 159 can extend radially through the respective segment 137. In non-limiting aspects, each coolant inlet 156a of the second winding support disc 132 can be coupled in fluid communication with a respective fluid collection surface 159.

Figure 8:
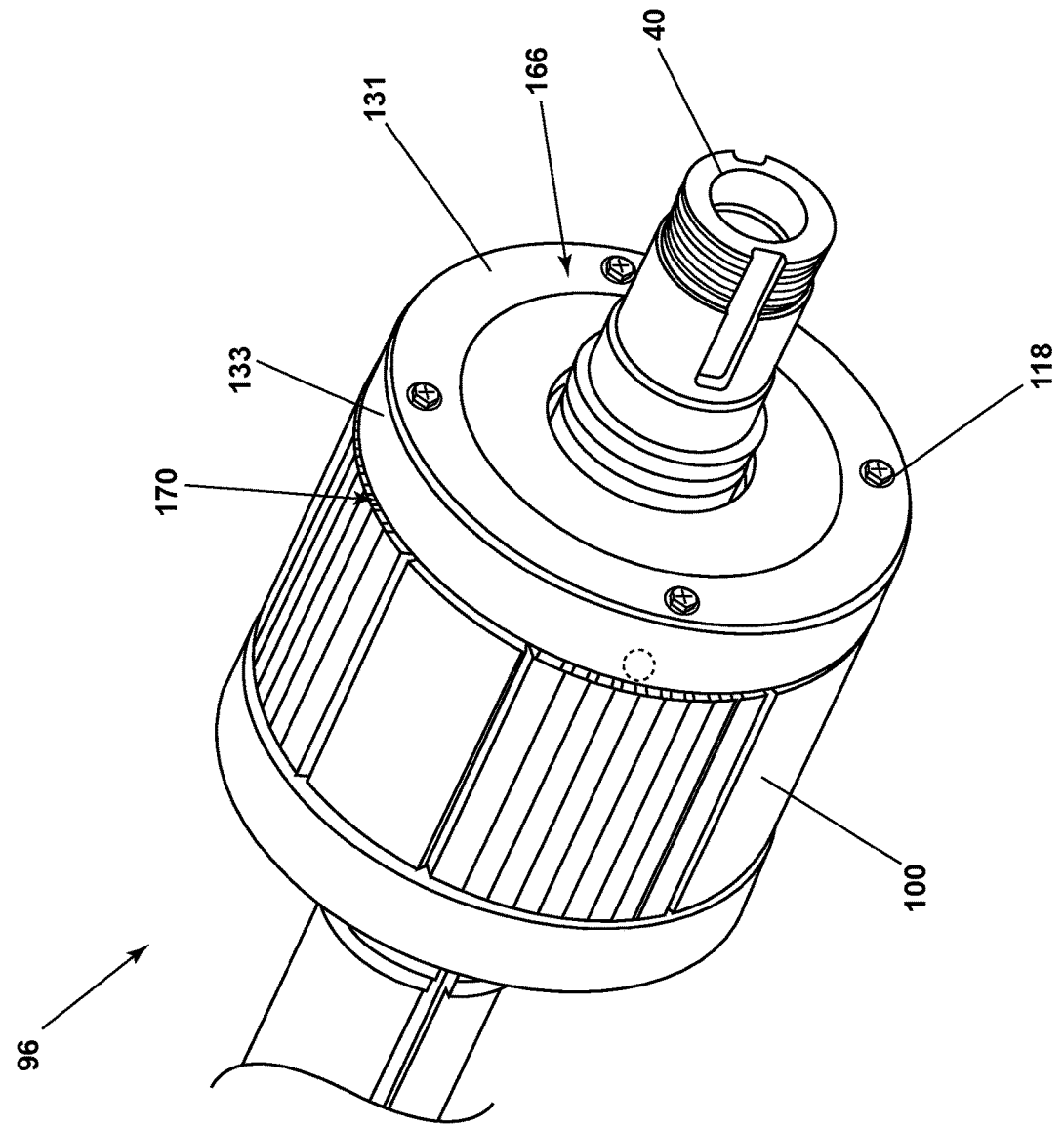
FIG. 8 is an isometric view of an exterior of the rotor assembly of FIG. 4, in accordance with various aspects described herein.

FIG. 8 depicts a non-limiting aspect of the rotor assembly 96 with the first winding support disc 131 and the retaining ring 133 installed. The retaining ring 133 is shown secured to the first winding support disc 131 via the fasteners 118. As shown, the retaining ring 133 can be disposed to circumscribe the first winding support disc 131. For example, the retaining ring 133 can overlie or radially surround a periphery of the winding support disc 131. An annular gap 170 can be defined between the retaining ring 133 and the rotor core 100. The second leg 133b is depicted as received on the recess 165 in a nested relationship. As can be seen, the second leg 133b of the retaining ring 133 and the first winding support disc 131 cooperatively define a continuous axially outward facing surface 166 via the nested relationship. By arranging the continuous axially outward facing surface 166, undesired gaps, openings, or other discontinuities can be reduced over conventional arrangements, and consequent beneficial reductions in windage losses can be obtained.

Furthermore, the retaining ring 133 can limit or arrest an axial movement of the first winding support disc 131. Additionally, in aspects, the retaining ring 133 and second winding support disc 132 can cooperatively limit a radial deflection or relative movement of the rotor winding end turns 112.

Figure 9:
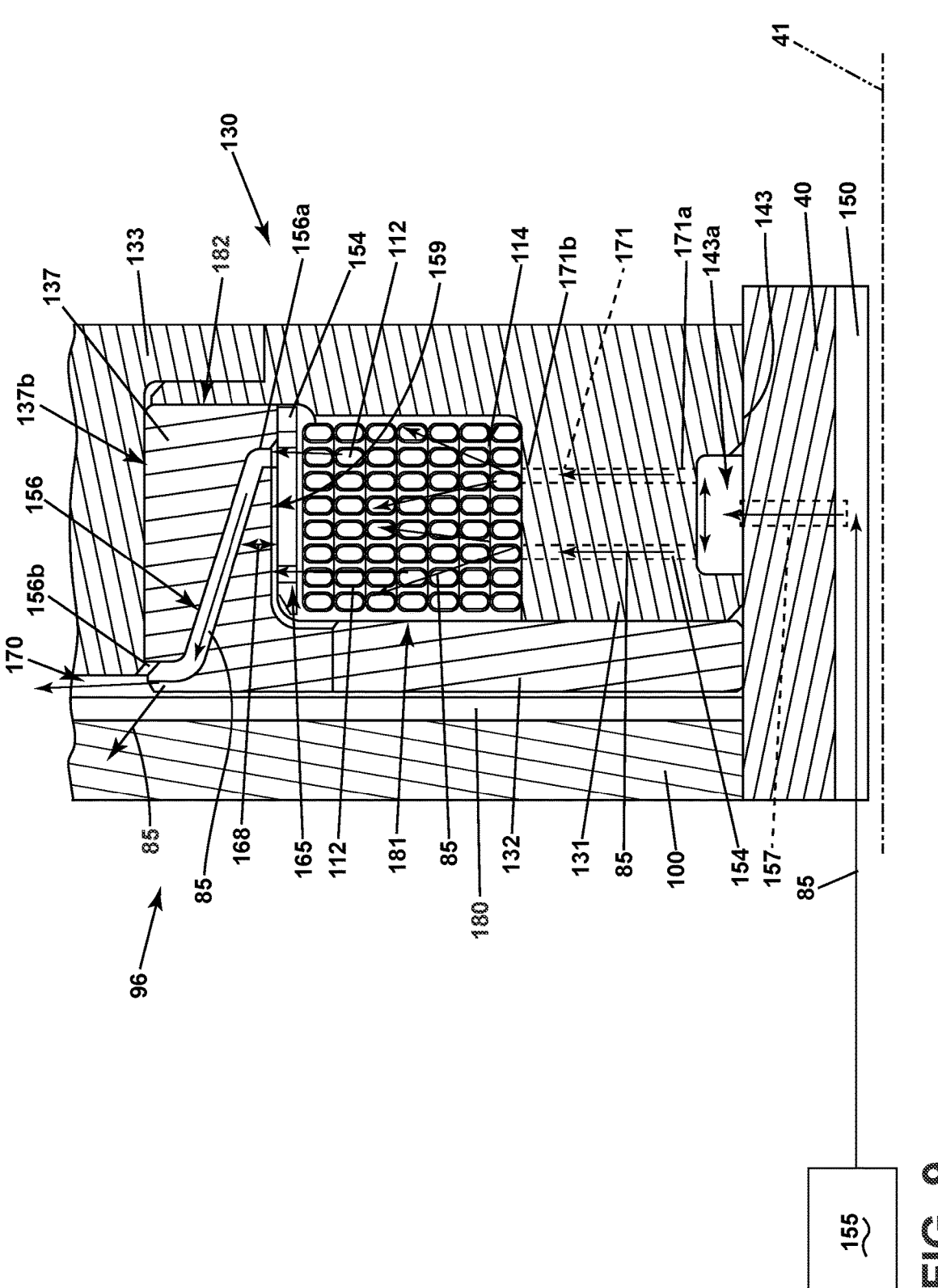
FIG. 9 illustrates a zoomed cross-sectional view of the winding support assembly of the rotor assembly of FIG. 4, in accordance with various aspects described herein.

FIG. 9 illustrates a portion of the rotor assembly 96 of FIG. 4 for better understanding of the operation of various non-limiting aspects. As illustrated, the winding support assembly 130, including the first winding support disc 131 and the second winding support disc 132 are rotatably coupled to the rotatable shaft 40. The second winding support disc 132 can include the radially inboard or radially central portion 138 and the radially outer portion 134 disposed radially outward from the radially central portion 138.

The retaining ring 133 is rotatably coupled to the second winding support disc 132, for example via the fasteners 118 (not shown). The fourth wall 154 is coupled to the first winding support disc 131, and cooperative with the second wall 152, third wall 153, fourth surface 144 of the first wall 151, and first surface 141 of the first winding support disc 131 to define the first chamber 181. The rotor winding end turns 112 are retainably received within the first chamber 181. The retaining ring 133 circumscribes the first winding support disc 131. For example, the retaining ring 133 can include the first leg 133a and the second leg 133b. The first leg 133a can overlie or radially surround the first winding support disc 131. The second leg 133b can be arranged transverse to the first leg 133a. The first leg 133a can be radially spaced from and surround the fourth wall 154. When so arranged, the first leg 133a, fourth wall 154, and first surface 141 of the first winding support disc 131 can cooperatively define a second chamber 182 therebetween. As illustrated in FIG. 9, the radially outer portion 134 of the second winding support disc 132 can be disposed in the second chamber 182. The set of radially extending end turn passages 114 are arranged in fluid communication with passages 169 defined through the fourth wall 154. The set of radially extending end turn passages 114 fluidly couple each first channel 171 to the coolant inlets 156a and corresponding fluid collection surfaces 159 of the second winding support disc 132. The annular gap 170 is arranged to extend radially between the retaining ring 133 and the rotor core 100. An insulating layer 180 can be located axially between at least part of the rotor core 100 and the winding support assembly 130.

With reference to FIG. 4, during operation of the generator 14, the rotation of the magnetic field generated by the set of rotor windings 110 relative to the set of stator windings 90 generates electricity in the stator windings 90. This magnetic interaction further generates heat in the set of rotor windings 110 and stator windings 90. In accordance with aspects described herein, coolant fluid can enter the rotatable shaft 40 of the rotor assembly 96 via the inlet port 82.

Referring again to FIG. 9, in operation, the fluid coolant flow (indicated by solid arrows) 85 is conveyed from the rotatable shaft 40 to the set of rotor winding end turns 112 and stator winding end turns (not shown). For example, the rotatable shaft 40 can define a coolant conduit 150 fluidly connected with a source of coolant 155. The source of coolant 155 can be, but is not limited to, the cooling fluid inlet port 82 (FIG. 3). The direction or location of the source of coolant 155 is not limited by the illustration and can be considered in any location that is fluidly coupled to the coolant conduit 150. It is further considered that additional conduit, pumps, valves, or other devices can be included to fluidly connect the source of coolant 155 and the coolant conduit 150. The fluid coolant flow 85 can be conveyed through the rotatable shaft 40 via the coolant conduit 150. The coolant conduit 150 can include a radially extending portion 157 through which the fluid coolant flow 85 can flow radially outward from the rotational axis 41 due to the centrifugal force effects of rotation of the rotatable shaft 40 during operation. The radially extending portion 157 fluidly couples the coolant conduit 150 and the first winding support disc 131.

The first winding support disc 131 can then receive the fluid coolant flow 85 from the coolant conduit 150, e.g., via the radially extending portion 157, at the third surface 143. For example, the fluid coolant flow 85 can collect on or in the one or more grooves 143a. The fluid coolant flow 85 can then be centrifugally conveyed from the third surface 143 to the coolant inlet 174a of the first channels 171, and further centrifugally conveyed through the first channels 171 to the coolant outlet 174b. The coolant outlet 174b can be arranged to provide the fluid coolant flow 85 radially outwardly therefrom. For example, in non-limiting aspects, the coolant outlet 174*b* can be configured to operatively spray finely atomized particles of coolant fluid toward the rotor winding end turns 112 end turn passages 114 within the first chamber 181.

The fluid coolant flow 85 is then centrifugally conveyed to the end turn passages 114. The fluid coolant flow 85 can flow radially outward through the end turn passages 114 that pass between the rotor windings 110. Heat from the set of rotor windings 110 can be transferred into the fluid coolant flow 85 by conduction. The fluid coolant flow 85 can be radially expelled from radially extending end turn passages 114 and through the radially extending passages 169 defined through the fourth wall 154.

In non-limiting aspects, the fluid collection surfaces 159 of the second winding support disc 132 are arranged to receive the fluid coolant flow 85 from the radially extending passages 169 defined through the fourth wall 154. The fluid coolant flow 85 received by the fluid collection surfaces 159 (such as in a radially outward direction) is delivered to the second channel 156. For example, the fluid coolant can be collected and redirected by the fluid collection surface 159 toward the coolant outlet 156*b*, via a respective second channel 156, such as in an axially inward direction (e.g., toward the rotor core 100). Additionally, or alternatively, the second channel 156, can be angled relative to the rotational axis 41, shown as angle 168, such that the second channel 156, receives and redirects the received fluid coolant flow 85 radially outward from the rotor end turn passages 114. The angle 168 can be configured to further redirect fluid conveyed by the second channel 156, radially outward to expel the fluid coolant flow 85 through the annular gap 170. Optionally, the coolant outlet 156*b* can be configured to direct coolant toward the set of stator windings (not shown) or the set of stator winding end turns (not shown) overlying the rotor winding end turns 112.

Many other possible aspects and configurations in addition to that shown in the above figures are contemplated by the present disclosure. For example, one aspect of the disclosure contemplates coolant conduits that extend along alternative portions or lengths of the set of rotor windings. In another example, the windings or the coolant conduits can further include intervening thermally conductive layers to assist in thermal conduction while, for example, avoiding an electrically conductive relationship between respective components. Additionally, the design and placement of the various components such as valves, pumps, or conduits can be rearranged such that a number of different in-line configurations could be realized.

Figure 10:
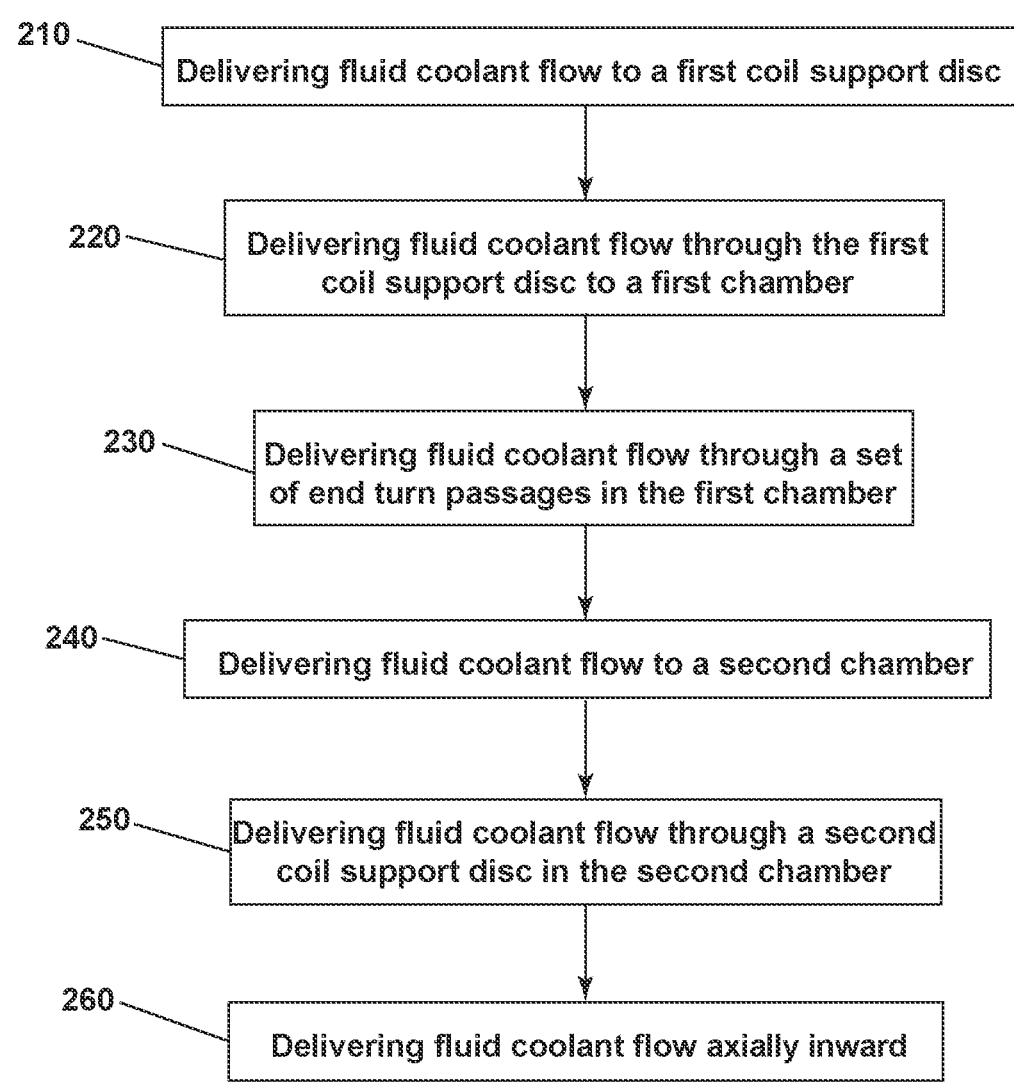
FIG. 10 illustrates an exemplary flowchart diagram of a method of cooling a rotor assembly, in accordance with various aspects described herein.

FIG. 10 illustrates a method 200 of cooling the set of rotor winding end turns 112 of the rotor assembly 96. Although described in terms of the rotor assembly 96, it will be appreciated that the method 200 can be applied to any electrical machine. While the method will be described herein, for case of understanding, in terms of the rotor assembly 96 as illustrated in FIGS. 4-9, other aspects are not so limited and method 200 can be implemented with electrical machines and rotor assemblies without departing from the scope of the disclosure.

For example, in non-limiting aspects, the winding support assembly 130, including the first winding support disc 131 and the second winding support disc 132 can be rotatably coupled to the rotatable shaft 40. The retaining ring 133 can be rotatably coupled to the second winding support disc 132. The fourth wall 154 can be coupled to the first winding support disc 131 cooperative with the second wall 152, third wall 153, fourth surface 144 of the first wall 151, and first surface 141 of the first winding support disc 131 to define the first chamber 181. The rotor winding end turns 112 can be disposed within the first chamber 181. The annular gap 170 is arranged to extend radially between the retaining ring 133 and the rotor core 100.

The method 200 includes, at 210, delivering the fluid coolant flow 85 to the first winding support disc 131. A non-limiting example of delivering the fluid coolant flow 85 to the first winding support disc 131 can include delivering the fluid coolant flow 85 through the rotatable shaft 40 via the coolant conduit 150. The coolant conduit 150 can include the radially extending portion 157 through which the fluid coolant flow 85 can flow radially outward from the rotational axis 41 due to the centrifugal force effects of the rotatable shaft 40.

The method 200 can include, at 220, delivering the fluid coolant flow 85 through the first winding support disc 131 to a first chamber 181. In non-limiting aspects, the first chamber 181 can be defined by the first winding support disc 131. For example, the first winding support disc 131 can be annular, having the axially inward facing (e.g., toward the rotor core 100) first side 131*a* defining the first surface 141, and the axially outward facing, (e.g., away from the rotor core 100) second side 131*b* defining the second surface 142. In non-limiting aspects, the first winding support disc 131 can further include the first wall 151 defining the radially inward facing third surface 143. The third surface 143 can define the bore 146 extending from the first surface 141 to the second surface 142, and sized to receive the rotatable shaft 40 therethrough, and configured to receive fluid coolant flow 85 therefrom. The first winding support disc 131 can be fixed to the rotatable shaft 40 via the third surface 143. The first wall 151 can further include the set of first channels 171 defined therethrough. Each first channel 171 can extend radially from the first end 171*a* at the third surface 143 to the opposing second end 171*b* at the fourth surface 144. Each first channel 171 can comprise the coolant inlet 174*a* defined on the third surface 143, and the corresponding coolant outlet 174*b* defined on the fourth surface 144, at the opposing second end 171*b*. In a non-limiting aspect, the delivering the fluid coolant flow 85 through the first winding support disc 131 to the first chamber 181 can include delivering the fluid coolant flow 85 from the coolant conduit 150 through the first channels 171 to the first chamber 181.

The method 200 can include, at 230, delivering the fluid coolant flow 85 radially through the end turn passages 114 defined between adjacent rotor winding end turns 112 disposed in the first chamber 181.

The method 200 can include, at 240, delivering the fluid coolant flow 85 from the first chamber 181 to a second chamber 182. For example, the second chamber 182 can be defined between the retaining ring 133 first leg 133*a* and the fourth wall 154. When so arranged, the first leg 133*a*, fourth wall 154, and first surface 141 of the first winding support disc 131 can cooperatively define a second chamber 182 therebetween. The radially outer portion 134 of the second winding support disc 132 can be disposed in the second chamber 182.

The method 200 can include at 250, delivering the fluid coolant flow 85 to the second winding support disc 132 in the second chamber 182. A non-limiting example of delivering the fluid coolant flow 85 to the second winding support disc 132 can include delivering the fluid coolant flow 85 from the first chamber 181 to the set of set of second channels 156 defined through the second winding support disc 132. Another non-limiting example of delivering the fluid coolant flow 85 from the first chamber 181 to the second winding support disc 132 can include delivering the fluid coolant flow 85 through the radially extending passages 169 defined through the fourth wall 154 to the second channels 156.

One or more of the first chamber 181, the fourth wall 154, the set of radially-extending end turn passages 114, the second winding support disc 132, or the second chamber 182 can convey or direct the fluid coolant flow 85 in a thermally conductive relationship with the set of rotor winding end turns 112 so heat from the set of rotor winding end turns 112 is transferred by conduction to the fluid coolant flow 85. The conduction of heat to the fluid coolant flow 85 and the thermally conductive relationships described herein can result in the fluid coolant flow 85 removing heat from the rotor assembly 96.

The method 200 can further include, at 260 expelling the fluid coolant flow 85 axially inward toward the set of rotor windings 110. It is further contemplated that the method 200 can include redirecting the fluid coolant flow 85 by the second channels 156 disposed at the angle 168 relative to the rotational axis 41 of the rotor assembly 96.

A non-limiting example of expelling, the fluid coolant flow 85 axially inward the fluid coolant can include collecting and redirecting the fluid coolant flow 85 by the fluid collection surface 159 toward the coolant outlet 156b, via the second channel 156, in an axially inward direction (e.g., toward the rotor core 100). The second channel 156, can be angled, shown as angle 168 relative to the rotational axis 41, such that the second channel 156, receives and redirects the received fluid coolant flow 85 radially outward from the rotor end turn passages 114. The angle 168 can be configured to further redirect fluid conveyed by second channel 156, radially outward to expel the fluid coolant flow 85 through the annular gap 170. Optionally, the coolant outlet 156b can be configured to direct coolant toward the set of stator windings (not shown) or the set of stator winding end turns (not shown) overlying the rotor winding end turns 112.

In non-limiting aspects, the method 200 can further include at 260, the directing the fluid coolant flow 85 radially outward through the annular gap 170. In non-limiting aspects the directing the fluid coolant flow 85 radially outward can include, directing, by the second channels 156 the fluid coolant flow 85 radially outward toward the annular gap 170. The redirecting from the second channels 156 toward the annular gap 170 allows the fluid coolant flow 85 to flow radially outward from the rotor assembly 96.

The sequence depicted is for illustrative purposes only and is not meant to limit the method 200 in any way as it is understood that the portions of the method can proceed in a different logical order, additional or intervening portions can be included, or described portions of the method can be divided into multiple portions, or described portions of the method can be omitted without detracting from the described method.

FIG. 11 illustrates a method 300 of assembling the winding support assembly 130. Although the method 300 will be described in terms of the rotor assembly 96, it will be appreciated that the method 300 can be applied to any electrical machine. While the method will be described herein, for ease of understanding, in terms of the rotor assembly 96 and the winding support assembly 130 of as illustrated in FIGS. 4-9, other aspects are not so limited and the method 300 can be implemented with other electrical machines and rotor assemblies without departing from the scope of the disclosure.

In non-limiting aspects, the rotor assembly 96 can include the rotor core 100, such as a laminated rotor core, rotatably connected to co-rotate with the rotatable shaft 40. The rotatable shaft 40 defines a rotational axis 41 and includes a coolant conduit 150 in fluid communication with the source of coolant 155. The rotor assembly 96 can include a set of winding support assemblies 130. Each winding support assembly 130 can respectively include a first winding support disc 131, a second winding support disc 132, and a retaining ring 133.

The rotor assembly 96 can further define the first end 102 and the second end 104, axially spaced from the first end 102. The rotor assembly 96 can include at least one rotor pole 106 defined by the rotor post 108 and formed when at least a portion of the rotor core 100 is wound with one or more sets of conductive rotor wiring or rotor windings 110 about a respective rotor post 108. The rotor windings 110 wound around the rotor post 108 can define a respective axial winding portion 111 extending axially along the rotor core 100, and respective rotor winding end turns 112 extending axially beyond the rotor core 100.

Each set of rotor winding end turns 112 can define the arcuate bight portion 113 overhanging or extending axially beyond the rotor core 100. Each set of rotor winding end turns 112 can define the circumferential width 112a, the radial height 112b, and the axial length 112c. In non-limiting aspects, each bight portion 113 can further define the respective channel 116 extending radially therethrough. For example, in non-limiting aspects each respective channel 116 can have a respective circumferential width defined by a circumferential width of corresponding rotor post 108. Additionally, the set of radially extending end turn passages 114 can be defined by gaps between immediately adjacent rotor winding end turns 112.

The method 300 can include, at 310, arranging a first winding support disc 131 axially spaced from the rotor core 100 to define the first chamber 181. The first winding support disc 131 can include the axially inward facing first side 131a defining the first surface 141, and the axially outward facing second side 131b defining the second surface 142. The first side 131a includes an annular first wall 151 having the radially inward facing third surface 143 defining the bore 146 sized to receive the rotatable shaft 40 therethrough, and the radially outward facing fourth surface 144 opposingly spaced from the third surface 143, the first wall 151 being rotatably coupled to the rotatable shaft 40 along the third surface 143. The first side 131a can further include the second wall 152 and the third wall 153 radially extending from the fourth surface 144 and axially extending from the first surface 141 and circumferentially spaced from each other, the fourth wall 154 extending between the second wall 152 and the third wall 153 and radially opposingly spaced from the fourth surface 144. The second wall 152, the third wall 153, the fourth wall 154, the first surface 141, and the fourth surface 144 cooperatively define the first chamber 181 therebetween.

In non-limiting aspects, the first wall 151 can define the set of first channels 171 extending radially therethrough from the third surface 143 to the fourth surface 144 in fluid communication with the coolant conduit 150. The fourth wall 154 can define the set of apertures 169 therethrough in fluid communication with the set of first channels 171 and the first chamber 181.

The method 300 includes at 320, disposing the set of rotor winding end turns 112 in the first chamber 181. The method 300 can further include at 330, coupling the first winding support disc 131 to the rotatable shaft 40. For example, the first winding support disc 131 can be coupled to the rotatable shaft 40, along the third surface 143 of the first wall 151.

The method 300 can also include at 340, arranging the retaining ring 133 circumscribing the first winding support disc 141 to cooperatively define the second chamber 182 therebetween. The retaining ring 133 can have an annular first leg 133a radially spaced from and circumscribing the fourth wall 154, wherein the first leg 133a and the fourth wall 154. In non-limiting aspects, the retaining ring 133 can further include the annular second leg 133b extending radially inward from the first leg 133a. The second leg 133b can be coupled to the second surface 142. The set of apertures 169 of the fourth wall 154 can be in fluid communication with the second chamber 182. In non-limiting aspects, the second surface 142 and the second leg 133b cooperatively define the continuous axially outward facing surface 166.

The method 300 can further include, at 350, coupling the second winding support disc 132 to the rotatable shaft 40. The second winding support disc 132 can comprise a radially central portion 138 and a radially outer portion 134. In non-limiting aspects the second winding support disc 132 can be coupled to the rotatable shaft (40) at the radially central portion 138. The radially inner portion 138 can be further coupled to the radially outer portion 134 via a set of radially extending spokes 136. In non-limiting aspects, the radially outer portion can overlie the set of rotor winding end turns 112 while being circumscribed by the retaining ring 133. In non-limiting aspects, the radially outer portion 134 can define the set of radially extending second channels 172 in fluid communication with the first chamber 181. The radially outer portion 134 can be disposed in the second chamber 182.

The sequence depicted is for illustrative purposes only and is not meant to limit the method 300 in any way as it is understood that the portions of the method can proceed in a different logical order, additional or intervening portions can be included, or described portions of the method can be divided into multiple portions, or described portions of the method can be omitted without detracting from the described method.

Aspects as disclosed herein improve upon existing methods by securing, protecting, and constraining the rotor winding end turns. Aspects as disclosed herein prevent movement of the end turn and provide mechanical and electrical isolation between the rotor winding end turns and nearby parts.

The aspects disclosed herein further provide a method and apparatus for cooling a set of rotor windings or a set of rotor winding end turns during electric machine operations (e.g., motor or generator operations). One advantage that may be realized in the above aspects is that the above-described aspects have significantly improved thermal conduction to remove heat from the set of rotor windings or the set of rotor winding end turns. The improved thermal conductivity between the set of rotor winding end turns and the coolant conduits coupled with the first and second channels provide for heat removal in a much more effective fashion from the rotor winding end turns to the coolant.

The increased thermal dissipation of the rotor winding end turns allows for a higher speed rotation, which may otherwise generate too much heat. The higher speed rotation may result in improved power generation or improved generator efficiency without increasing generator size. The described aspects having the fluid channels for the wet cavity machine are also capable of cooling the stator windings or end turn segments which further reduces thermal losses of the electric machine. Reduced thermal losses in the electric machine allows for greater efficiency and greater power density of the generator.

When designing aircraft components, reliability is also important feature. The above-described rotor assembly can provide additional physical stability and improved cooling to the rotor end windings. The stability and cooling provided by the winding support assembly allow an increase in performance and reliability.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the present disclosure are provided by the subject matter of the following clauses:

A rotor assembly comprising: a rotatable shaft having a rotational axis and defining a coolant conduit in fluid communication with a source of coolant; a rotor core rotatably coupled to the rotatable shaft and defining at least one rotor post; a set of rotor windings wound around the rotor post and defining a corresponding set of rotor winding end turns; and a winding support assembly fixed to the rotatable shaft, the winding support assembly including: a first winding support disc axially spaced from the rotor core, having an axially inward facing first side defining a first surface, and an axially outward facing second side defining a second surface, the first side including an annular first wall having a radially inward facing third surface defining a bore sized to receive the rotatable shaft therethrough, and a radially outward facing fourth surface opposingly spaced from the third surface, the annular first wall being rotatably coupled to the rotatable shaft along the third surface, the first side further including a second wall and a third wall radially extending from the fourth surface and, axially extending from the first surface, and circumferentially spaced from each other, a fourth wall extending between the second wall and the third wall and radially opposingly spaced from the fourth surface; wherein the second wall, the third wall, the fourth wall, the first surface, and the fourth surface cooperatively define a first chamber therebetween; and wherein the set of rotor winding end turns is received in the first chamber.

The rotor assembly of the preceding clause, wherein the first wall defines a set of first channels extending radially therethrough from the third surface to the fourth surface in fluid communication with the coolant conduit.

The rotor assembly of any preceding clause, wherein the fourth wall defines a set of apertures therethrough in fluid communication with the set of first channels and the first chamber.

The rotor assembly of any preceding clause, wherein the third surface defines a groove thereon surrounding the rotatable shaft, the groove in fluid communication with the set of first channels.

The rotor assembly of any preceding clause, further comprising a retaining ring circumscribing the first winding support disc, the retaining ring having an annular first leg circumscribing and radially spaced from the fourth wall, wherein the annular first leg and the fourth wall cooperatively define a second chamber therebetween.

The rotor assembly of any preceding clause, wherein the set of apertures of the fourth wall are in fluid communication with the second chamber.

The rotor assembly of any preceding clause, wherein the retaining ring further includes an annular second leg extending radially inward from the annular first leg, the annular second leg coupled to the second surface.

The rotor assembly of any preceding clause, wherein the second surface defines an annular recess along a circumferential periphery of the second side, wherein the annular second leg is received in the recess.

The rotor assembly of any preceding clause, wherein the second surface and the annular second leg cooperatively define a continuous axially outward facing surface.

The rotor assembly of any preceding clause, further comprising a second winding support disc comprising a radially central portion and a radially outer portion, the radially central portion coupled to the rotatable shaft, and further coupled to the radially outer portion via a set of radially extending spokes, the radially outer portion overlying the set of rotor winding end turns and being circumscribed by the retaining ring.

The rotor assembly of any preceding clause, wherein the radially outer portion defines a set of radially extending second channels defined therethrough in fluid communication with the first chamber.

The rotor assembly of any preceding clause, wherein each respective spoke is disposed between a corresponding end turn of the set of rotor windings and the rotor core.

The rotor assembly of any preceding clause, wherein the radially outer portion is disposed in the second chamber.

The rotor assembly of any preceding clause, wherein the set of rotor winding end turns define end turn passages extending radially therethrough.

A method of cooling a set of rotor winding end turns supported by a first winding support disc rotatably coupled to a rotor assembly, the method comprising: delivering a fluid coolant flow to the first winding support disc; delivering the fluid coolant flow through first channels defined through the first winding support disc and to a first chamber at least partially defined by the first winding support disc; delivering the fluid coolant flow radially outward through end turn passages defined between adjacent rotor winding end turns disposed in the first chamber; and delivering the fluid coolant flow from the first chamber to a second chamber at least partially defined by the first winding support disc.

The method of any preceding clause, further comprising delivering the fluid coolant flow to a radially outer portion of a second winding support disc at least partially disposed in the second chamber.

The method of any preceding clause, wherein the delivering the fluid coolant flow to the radially outer portion of the second winding support disc includes redirecting the fluid coolant flow through a second channel defined through the radially outer portion of the second winding support disc in an axially inward direction.

The method of any preceding clause, wherein the second channel extends through the radially outer portion of the second winding support disc at an angle with respect to an axis of rotation of the rotor assembly.

The method of any preceding clause, further comprising delivering the fluid coolant flow by the second winding support disc axially outward toward the rotor winding end turns.

The method of any preceding clause, further comprising delivering the fluid coolant flow by the second winding support disc radially outward from the second winding support disc.

A method of assembling a winding support assembly for a rotor of an electrical machine, the rotor including a rotatable shaft having a rotational axis and defining a coolant conduit in fluid communication with a source of coolant, a rotor core rotatably coupled to the rotatable shaft and defining at least one rotor post, a set of rotor windings wound around the rotor post and defining a corresponding set of rotor winding end turns, the method comprising: arranging a first winding support disc axially spaced from the rotor core to define a first chamber.

The method of any previous clause, wherein the first winding support disc includes having an axially inward facing first side defining a first surface, and an axially outward facing second side defining a second surface, the first side including an annular first wall having a radially inward facing third surface defining a bore sized to receive the rotatable shaft therethrough, and a radially outward facing fourth surface opposingly spaced from the third surface, the first wall being rotatably coupled to the rotatable shaft along the third surface, the first side further including a second wall and a third wall radially extending from the fourth surface and axially extending from the first surface and circumferentially spaced from each other, a fourth wall extending between the second wall and the third wall and radially opposingly spaced from the fourth surface, wherein the second wall, third wall, fourth wall, first surface, and fourth surface cooperatively define the first chamber therebetween.

The method of any previous clause, wherein the first wall defines a set of first channels extending radially therethrough from the third surface to the fourth surface in fluid communication with the coolant conduit.

The method of any previous clause, wherein the fourth wall defines a set of apertures therethrough in fluid communication with the set of first channels and the first chamber.

The method of any previous clause, further comprising disposing the set of rotor winding end turns in the first chamber.

The method of any previous clause, further comprising coupling the first winding support disc to the rotatable shaft.

The method of any previous clause, wherein coupling the first winding support disc to the rotatable shaft includes coupling the annular first wall to the rotatable shaft along the third surface.

The method of any previous clause, wherein the first wall defines a set of first channels extending radially therethrough from the third surface to the fourth surface in fluid communication with the coolant conduit.

The method of any previous clause, further comprising arranging a retaining ring to circumscribe the first winding support disc and define a second chamber therebetween.

The method of any previous clause, wherein the set of apertures of the fourth wall are in fluid communication with the second chamber.

The method of any previous clause, wherein the retaining ring further includes an annular second leg extending radially inward from the first leg, the second leg coupled to the second surface.

The method of any previous clause, wherein the second surface and the second leg cooperatively define a continuous axially outward facing surface.

The method of any previous clause, further comprising coupling a second winding support disc to the rotatable shaft.

The method of any previous clause, wherein the second winding support disc includes a radially central portion and a radially outer portion and further coupled to the radially outer portion via a set of radially extending spokes.

The method of any previous clause, wherein the coupling a second winding support disc to the rotatable shaft includes coupling the second winding support disc to the rotatable shaft along the radially central portion.

The method of any previous clause, wherein the radially outer portion overlies the set of rotor winding end turns and is circumscribed by the retaining ring.

The method of any previous clause, wherein the radially outer portion defines a set of radially extending second channels defined therethrough in fluid communication with the first chamber.

The method of any previous clause, wherein the radially outer portion is disposed in the second chamber. CLAIMS

What is claimed is:

1. A rotor assembly comprising:
a rotatable shaft having a rotational axis and defining a coolant conduit in fluid communication with a source of coolant;
a rotor core rotatably coupled to the rotatable shaft and defining at least one rotor post;
a set of rotor windings wound around the rotor post and defining a corresponding set of rotor winding end turns; and
a winding support assembly fixed to the rotatable shaft, the winding support assembly including:
a first winding support disc axially spaced from the rotor core, having an axially inward facing first side defining a first surface, and an axially outward facing second side defining a second surface,
the first side including an annular first wall having a radially inward facing third surface defining a bore sized to receive the rotatable shaft therethrough, and a radially outward facing fourth surface opposingly spaced from the third surface, the annular first wall being rotatably coupled to the rotatable shaft along the third surface,
the first side further including a second wall and a third wall radially extending from the fourth surface and, axially extending from the first surface, and circumferentially spaced from each other,
a fourth wall extending between the second wall and the third wall and radially opposingly spaced from the fourth surface;
wherein the second wall, the third wall, the fourth wall, the first surface, and the fourth surface cooperatively define a first chamber therebetween; and wherein the set of rotor winding end turns is received in the first chamber;
wherein the annular first wall defines a set of first channels extending radially therethrough from the third surface to the fourth surface in fluid communication with the coolant conduit; and
wherein the third surface defines a groove thereon surrounding the rotatable shaft, the groove in fluid communication with the set of first channels.

2. The rotor assembly of claim 1, wherein the fourth wall defines a set of apertures therethrough in fluid communication with the set of first channels and the first chamber.

3. The rotor assembly of claim 2, further comprising a retaining ring circumscribing the first winding support disc, the retaining ring having an annular first leg circumscribing and radially spaced from the fourth wall, wherein the annular first leg and the fourth wall cooperatively define a second chamber therebetween.

4. The rotor assembly of claim 3, wherein the set of apertures of the fourth wall are in fluid communication with the second chamber.

5. The rotor assembly of claim 3, wherein the retaining ring further includes an annular second leg extending radially inward from the annular first leg, the annular second leg coupled to the second surface.

6. The rotor assembly of claim 5, wherein the second surface defines an annular recess along a circumferential periphery of the second side, wherein the annular second leg is received in the annular recess.

7. The rotor assembly of claim 6, wherein the second surface and the annular second leg cooperatively define a continuous axially outward facing surface.

8. The rotor assembly of claim 3, further comprising a second winding support disc comprising a radially central portion and a radially outer portion, the radially central portion coupled to the rotatable shaft, and further coupled to the radially outer portion via a set of radially extending spokes, the radially outer portion overlying the set of rotor winding end turns and being circumscribed by the retaining ring.

9. The rotor assembly of claim 8, wherein the radially outer portion defines a set of radially extending second channels defined therethrough in fluid communication with the first chamber.

10. The rotor assembly of claim 8, wherein each respective spoke is disposed between a corresponding end turn of the set of rotor windings and the rotor core.

11. The rotor assembly of claim 8, wherein the radially outer portion is disposed in the second chamber.

12. The rotor assembly of claim 1, wherein the set of rotor winding end turns define end turn passages extending radially therethrough.

13. A method of cooling a set of rotor winding end turns supported by a first winding support disc rotatably coupled to a rotor assembly, the method comprising:
delivering a fluid coolant flow to the first winding support disc;
delivering the fluid coolant flow through first channels defined through the first winding support disc and to a first chamber at least partially defined by the first winding support disc;
delivering the fluid coolant flow radially outward through end turn passages defined between adjacent rotor winding end turns disposed in the first chamber; and
delivering the fluid coolant flow from the first chamber to a second chamber at least partially defined by the first winding support disc; and delivering the fluid coolant flow to a radially outer portion of a second winding support disc at least partially disposed in the second chamber by redirecting the fluid coolant flow through a second channel defined through the radially outer portion of the second winding support disc in an axially inward direction.

14. The method of claim 13, wherein the second channel extends through the radially outer portion of the second winding support disc at an angle with respect to an axis of rotation of the rotor assembly.

15. The method of claim 13, further comprising delivering the fluid coolant flow by the second winding support disc axially outward toward the rotor winding end turns.

16. The method of claim 13, further comprising delivering the fluid coolant flow by the second winding support disc radially outward from the second winding support disc.

* * * * *